US012275850B2

(12) United States Patent
Leonardi et al.

(10) Patent No.: US 12,275,850 B2
(45) Date of Patent: Apr. 15, 2025

(54) ORGANIC-INORGANIC HYBRID MATERIAL COMPRISING A METAL AND LIGNIN, PROCESSES FOR PREPARING THE SAME AND USES THEREOF

(71) Applicants: UPM-KYMMENE CORPORATION, Helsinki (FI); GREEN INNOVATION GMBH, Innsbruck (AT)

(72) Inventors: Giuliano Leonardi, Innsbruck (AT); Suvi Pietarinen, Helsinki (FI); Christian Hübsch, Helsinki (FI); Mauro Carcelli, Parma (IT); Paolo Pelagatti, Parma (IT); Dominga Rogolino, Parma (IT); Valentina Sinisi, Parma (IT)

(73) Assignees: UPM-KYMMENE CORPORATION, Helsinki (FI); GREEN INNOVATION GMBH, Innsbruck (AT)

( * ) Notice: Subject to any disclaimer, the term of this patent is extended or adjusted under 35 U.S.C. 154(b) by 833 days.

(21) Appl. No.: 17/252,879

(22) PCT Filed: Jun. 14, 2019

(86) PCT No.: PCT/EP2019/065704
§ 371 (c)(1),
(2) Date: Dec. 16, 2020

(87) PCT Pub. No.: WO2020/002008
PCT Pub. Date: Jan. 2, 2020

(65) Prior Publication Data
US 2021/0115257 A1 Apr. 22, 2021

(30) Foreign Application Priority Data
Jun. 29, 2018 (IT) ........................ 102018000006815

(51) Int. Cl.
*C08L 97/00* (2006.01)
*A01N 59/20* (2006.01)
(Continued)

(52) U.S. Cl.
CPC ............ *C08L 97/005* (2013.01); *A01N 59/20* (2013.01); *A01N 65/00* (2013.01); *A23K 20/111* (2016.05);
(Continued)

(58) Field of Classification Search
CPC ... C08L 97/005; A23K 20/158; A23K 20/195; A23K 20/111; A01N 59/20; A01N 65/00; C08J 3/12; C08J 3/2053; C08J 2397/00
(Continued)

(56) References Cited

U.S. PATENT DOCUMENTS

2009/0062516 A1* 3/2009 Belanger ................ C13K 13/00
530/502
2014/0256545 A1 9/2014 Velev et al.
(Continued)

FOREIGN PATENT DOCUMENTS

CN 103396224 A * 11/2013
CN 107312315 A * 11/2017 ............. A01N 25/10
(Continued)

OTHER PUBLICATIONS

Goto et al., JP 2014-064490 A machine translation in English, Apr. 17, 2014. (Year: 2014).*
(Continued)

*Primary Examiner* — David T Karst
(74) *Attorney, Agent, or Firm* — Dickinson Wright PLLC

(57) ABSTRACT

An organic-inorganic hybrid material is disclosed comprising a metal compound and a lignin fraction, as well as
(Continued)

processes for preparing the same and uses as an antimicrobial agent in agriculture, and in human and animal food industry.

17 Claims, 18 Drawing Sheets

(51) Int. Cl.
  *A01N 65/00* (2009.01)
  *A23K 20/111* (2016.01)
  *A23K 20/158* (2016.01)
  *A23K 20/195* (2016.01)
  *C08J 3/12* (2006.01)
  *C08J 3/205* (2006.01)
(52) U.S. Cl.
  CPC .......... *A23K 20/158* (2016.05); *A23K 20/195* (2016.05); *C08J 3/12* (2013.01); *C08J 3/2053* (2013.01); *C08J 2397/00* (2013.01)
(58) Field of Classification Search
  USPC ......................................................... 530/506
  See application file for complete search history.

(56) References Cited

U.S. PATENT DOCUMENTS

| 2016/0130408 A1* | 5/2016 | Jansen | C08H 6/00 514/777 |
| 2016/0215143 A1* | 7/2016 | Gotou | C08L 97/005 |

FOREIGN PATENT DOCUMENTS

| JP | 2003040792 A | * | 2/2003 | |
| JP | 2003339344 A | * | 12/2003 | ............... A23L 1/29 |
| JP | 2014064490 A | * | 4/2014 | ............... A23L 1/307 |
| WO | WO-9403648 A1 | * | 2/1994 | ............... C22B 1/243 |
| WO | WO-2015044528 A1 | * | 4/2015 | ............... B27N 3/002 |
| WO | 2016116668 A1 | | 7/2016 | |
| WO | WO-2016172657 A2 | * | 10/2016 | ............... A63L 33/10 |
| WO | WO-2016173939 A1 | * | 11/2016 | ............... A01N 25/10 |
| WO | 2018001935 A1 | | 1/2018 | |

OTHER PUBLICATIONS

Takagaki, JP 2003-339344 A machine translation in English, Dec. 2, 2003. (Year: 2003).*
Qiu et al., CN 107312315 A machine translation in English, Nov. 3, 2017. (Year: 2017).*
Qiu et al., CN 103396224 A machine translation in English, Nov. 20, 2013. (Year: 2013).*
Sakagami et al., JP 2003-040792 A, machine translation in English, Feb. 13, 2003. (Year: 2003).*
Rangelova Nadezhda et al., "Preparation and Antibacterial Behavior of Lignin-Copper Composite Materials", Bulgarska Akademiya Na Naukite; Jan. 1, 2016.
Galina Telysheva, et al., "Synthesis of Lignin-Based Inorganic/Organic Hybrid Materials Favorable for Detoxification of Ecosystem Components", Bioresources, Nov. 1, 2009.
Helliwell, M.; et al.; Brochantite. Acta crystallog. C, 1997, 53, 1369-1371.
Elgamily, et al.; Antibacterial and Remineralization Efficacy of Casein Phosphopeptide, Glycomacropeptide Nanocomplex, and Probiotics in Experimental Toothpastes: An In Vitro Comparative Study; European Journal of Dentistry; 2019.

* cited by examiner (a)

(b)

(a)

(b)

(a)

(b)

ORGANIC-INORGANIC HYBRID MATERIAL COMPRISING A METAL AND LIGNIN, PROCESSES FOR PREPARING THE SAME AND USES THEREOF

FIELD OF THE INVENTION

The present invention concerns an organic-inorganic hybrid material comprising a metal compound and a lignin fraction, as well as processes for preparing the same and uses as an antimicrobial agent in agriculture, and in human and animal food industry.

STATE OF THE ART

In some industries, for example in the food industry, it is necessary to avoid bacteria proliferation in order to maintain hygienic conditions of the products processed into the industry, for example a food product. In farms, and in slaughterhouses, bacteria proliferations are, on the one hand very common, and on the other hand it is very important to limit and avoid such proliferations.

Known products are often inefficacious against a plurality of harmful or pathogenic microorganisms, therefore many different products have to be used at the same time, and also known products are often polluting both for the environment and for the product for which they are used.

Product typically used in these cases are antibiotics. However, the overuse and misuse of these medications, as well as a lack of new drug development by the pharmaceutical industry due to reduced economic incentives and challenging regulatory requirements, is considered to be underlying the antibiotic resistance crisis.

Antimicrobial resistance (AMR) is the ability of a microbe to resist the effects of medication previously used to treat them. The term includes the more specific "antibiotic resistance", which applies only to bacteria becoming resistant to antibiotics. Resistant microbes are more difficult to treat, requiring alternative medications or higher doses, both of which may be more expensive or more toxic.

The World Health Organization affirmed that inappropriate use of antibiotics in animal husbandry is an underlying contributor to the emergence and spread of antibiotic-resistant germs, and that the use of antibiotics as growth promoters in animal feeds should be restricted. The World Organisation for Animal Health has added to the Terrestrial Animal Health Code a series of guidelines with recommendations to its members for the creation and harmonization of national antimicrobial resistance surveillance and monitoring programs, monitoring of the quantities of antibiotics used in animal husbandry, and recommendations to ensure the proper and prudent use of antibiotic substances. Another guideline is to implement methodologies that help to establish associated risk factors and assess the risk of antibiotic resistance.

In this regard, also the products used in agriculture for crop protection and promotion play a relevant role in the quality of human and animal feed, especially products used to prevent or treat crop affections caused by bacteria, fungi, or viruses.

It is therefore felt the need to effectively counteract these harmful and pathogenic microorganisms thus avoiding the use of antibiotics, while at the same time preserving the human and animal health, the crop and environment.

SUMMARY OF THE INVENTION

The above object has been achieved by an organic-inorganic hybrid material comprising a metal compound and a lignin fraction, as claimed in claim 1.

In another aspect, the present invention relates to processes for preparing said organic-inorganic hybrid material.

In a further aspect, the present invention relates to a use of said organic-inorganic hybrid material as an anti-microbial agent in agriculture.

In an additional aspect, the present invention concerns an agro-chemical product comprising the organic-inorganic hybrid material, and agro-chemical additives.

In a further aspect, the present invention relates to a use of said organic-inorganic hybrid material as an antimicrobial agent in human and animal feed.

In an additional aspect, the present invention concerns a food product comprising the organic-inorganic hybrid material, and suitable food ingredients.

In another aspect, the present invention concerns a food supplement comprising the organic-inorganic hybrid material, and suitable food carriers.

BRIEF DESCRIPTION OF THE FIGURES

The characteristics and the advantages of the present invention will become apparent from the following detailed description, from the working examples provided for illustrative purposes, and from the accompanying figures, wherein.

DETAILED DESCRIPTION OF THE INVENTION

Figure 1:
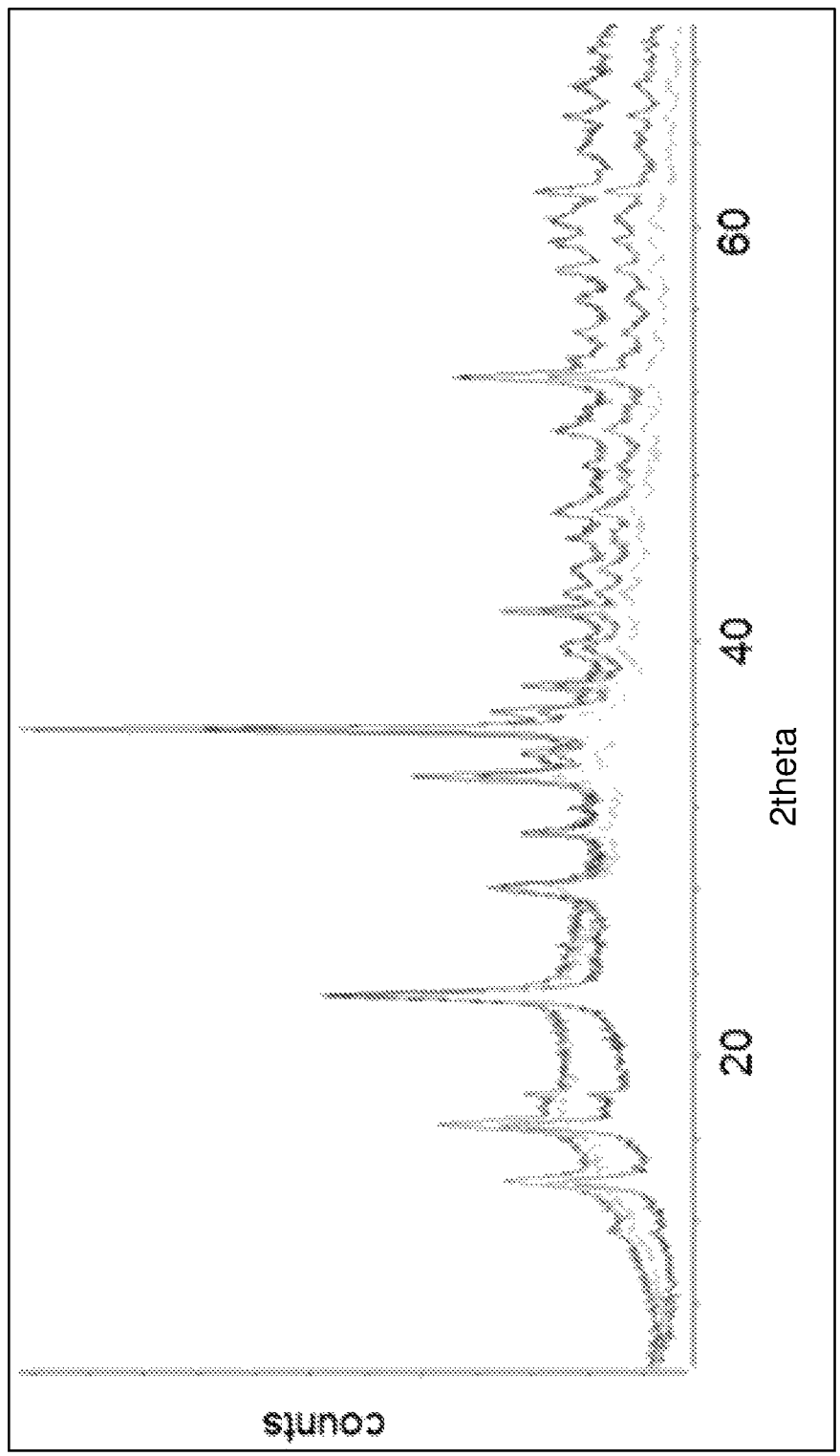
FIG. 1 shows the XRPD plots of HMW-Cu with different copper content, as per Example 3.

The subject of the invention therefore is an organic-inorganic hybrid material comprising a metal compound and a lignin fraction, wherein:

the metal compound is selected from metal hydroxide, metal oxide, metal halide, metal sulphate, metal nitrate, metal gluconate, metal oxychloride, metal acetate, metal carbonate, metal silicate, metal aluminosilicate, and combinations thereof, and the metal is selected from Li, Na, K, Be, Mg, Ca, Sr, Ba, Ti, Cr, Mn, Fe, Co, Ni, Cu, Zn, Ag, Au, Al, Bi, As, and mixtures thereof, the lignin fraction comprises fragments having a weight average molecular weight up to 10,000 Daltons, as measured by Size-Exclusion Chromatography, said fragments comprising up to 55 phenylpropane units on weight average, and wherein the metal compound is embedded in the lignin fraction in an amount up to 50 wt %, based on the weight of the organic-inorganic hybrid material.

The term "organic-inorganic hybrid material" indicates a composite material comprising inorganic materials and organic polymers. In the present case, the metal compound represents the inorganic material and the lignin fraction represents the organic polymer.

In preferred embodiments, in said organic-inorganic hybrid material, the inorganic material is embedded within the organic polymer; more preferably, the inorganic material is scaffolded on the organic polymer.

Preferably, said metal is selected from Mg, Ca, Ti, Fe, Mn, Co, Ni, Cu, Zn, Ag, Al, and mixtures thereof.

In preferred embodiments, the metal comprises Cu, Fe or a mixture thereof.

In more preferred embodiments, the metal compound comprises brochantite, gerhardtite, goethite, lepidocrocite, or a mixture thereof.

In the most preferred embodiment, the metal compound comprises brochantite. Brochantite is a sulfate mineral having the chemical formula $Cu_4SO_4(OH)_6$.

Lignin is a class of complex organic polymers that form important structural materials in the support tissues of some algae, vascular plants, included their bark, and herbaceous plants, such as wood (i.e. softwood and hardwood), straw of all cereals, cane bagasse, grass, linen, jute, hemp, or cotton. Lignin can also have mineral source, such as peat, leonardite and coal.

Chemically, in its native form, lignin is a very irregular, randomly cross-linked polymer of phenylpropane units joined by many different linkages, with a weight average molecular weight of 20,000 Daltons or higher. A representative and illustrative lignin fragment (I) containing the most important bonding patterns is shown herein below:

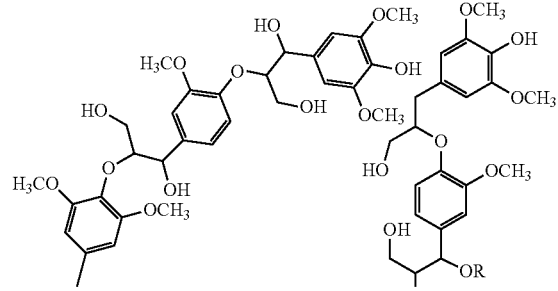

-continued

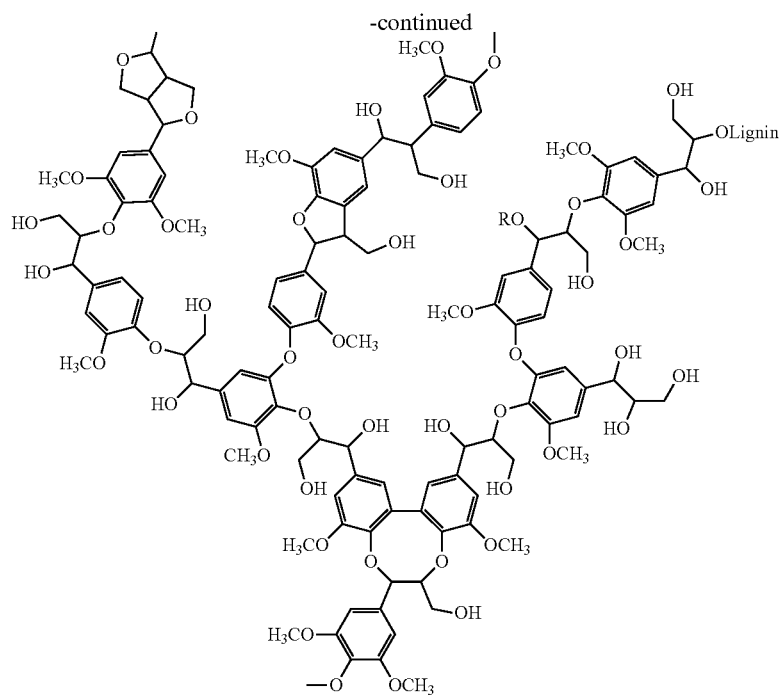

Said polymer is the result of an enzyme-mediated dehydrogenative polymerization of three phenylpropanoid monomer precursors:

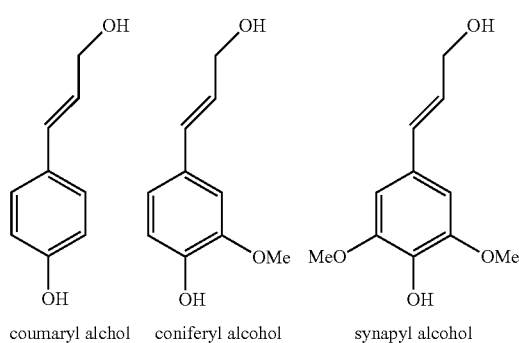 [SMILES: OC/C=C/c1ccc(O)cc1 ; COc1cc(/C=C/CO)ccc1O ; COc1cc(/C=C/CO)cc(OC)c1O]

coumaryl alchol    coniferyl alcohol    synapyl alcohol which result in the following moieties, respectively:

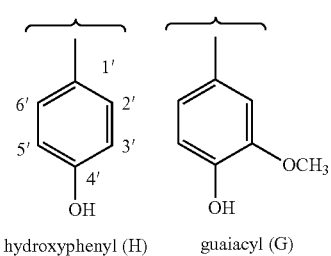

hydroxyphenyl (H)    guaiacyl (G)

-continued

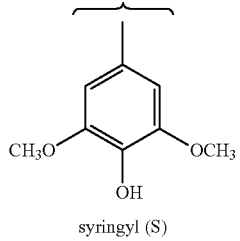

syringyl (S)

Coniferyl alcohol occurs in all species and is the dominant monomer in conifers (softwoods). Deciduous (hardwood) species contain up to 40% synapyl alcohol units while grasses and agricultural crops may also contain coumaryl alcohol units.

Lignin can be categorized to softwood and hardwood lignins according to their raw biomass sources.

Raw biomass sources that can be suitable starting materials for obtaining the relevant lignin fraction are any lignin including essentially pure lignin as well as kraft lignin, biomass originating lignin, lignin from alkaline pulping process, lignin from soda process, lignin from organosolv pulping, lignin from enzymatic processes, lignin from steam explosion processes, and any combination thereof.

By the expression "essentially pure lignin", it should be understood as at least 80% pure lignin on a dry raw biomass basis, preferably at least 90% pure lignin, more preferably at least 95% pure lignin, the remainder being extractives and carbohydrates such as hemicelluloses as well as inorganic matter.

By the expression "kraft lignin", it is to be understood lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different techniques including e.g. precipitation and filtration. Lignin usually begins precipitating at pH values below 11-12. Different pH values can be used in order to precipitate lignin fractions with different properties. These lignin fractions may differ from each other by molecular weight distribution, e.g. $M_w$ and $M_n$, polydispersity, hemicellulose and extractive contents, contents of inorganic material. The precipitated lignin can be purified from inorganic impurities, hemicellulose and wood extractives using acidic washing steps. Further purification can be achieved by filtration.

Alternatively, the lignin is separated from pure biomass. The separation process can begin with liquidizing the biomass with strong alkali followed by a neutralization process. After the alkali treatment, the lignin can be precipitated in a similar manner as presented above.

Alternatively, the separation of lignin from biomass comprises a step of enzyme treatment. The enzyme treatment modifies the lignin to be extracted from biomass.

Lignin separated from pure biomass is essentially sulphur-free (sulphur content less than 3%) and thus valuable in further processing.

Preferably, the lignin so separated is also subjected to a depolymerization process in order to further reduce the weight average molecular weight of fragments.

In some embodiments, the lignin so separated is also subjected to a depolymerization process in order to further reduce the weight and number average molecular weights of fragments.

Suitable depolymerization processes include base-catalyzed depolymerization, acid-catalyzed depolymerization, metallic catalyzed depolymerization, ionic liquids-assisted depolymerization, and supercritical fluids-assisted lignin depolymerization.

In preferred embodiments, said lignin fraction is obtained by base-catalyzed depolymerization.

Preferably, said lignin fraction is obtained by subjecting the separated lignin to a base-catalyzed depolymerization at a temperature lower than 300° C. and a pressure lower than 30 MPa.

The pH is set between 11 and 14, by adding a base such as NaOH, KOH, Ca(OH)$_2$, LiOH, K$_2$CO$_3$, or a mixture thereof.

For the purposes of the present invention, the weight average molecular weight ($M_w$) of fragments in the lignin fraction is measured by Size-Exclusion Chromatography (or 'SEC'). SEC employs a stagnant liquid present in the pores of beads as the stationary phase, and a flowing liquid as the mobile phase. The mobile phase can therefore flow between the beads and also in and out of the pores in the beads. The separation mechanism is based on the size of the polymer molecules in solution. Bigger molecules will elute first. Small molecules that can enter many pores in the beads take a long time to pass through the column and therefore exit the column slowly. To determine the molecular weights of the components of a polymer sample, a calibration with standard polymers of known weight must be performed. Values from the unknown sample are then compared with the calibration graph. The retention times depend on the used column material, eluent and how similar the used standards are compared to the samples. In the present invention, the eluent is preferably 0.1 M NaOH.

Preferably, said lignin fraction comprises fragments having a weight average molecular weight up to 6,000 Daltons.

More preferably, said lignin fraction comprises fragments having a weight average molecular weight up to 5,500 Daltons.

Even more preferably, said lignin fraction comprises fragments having a weight average molecular weight up to 5,000 Daltons.

In some embodiments, said lignin fraction comprises fragments having a weight average molecular weight up to 2,000 Daltons.

In preferred embodiments, said lignin fraction comprises fragments having a weight average molecular weight up to 1,500 Daltons.

In other embodiments, said lignin fraction comprises fragments having a weight average molecular weight down to 150 Daltons.

In preferred embodiments, said lignin fraction comprises fragments having a weight average molecular weight of 150 Daltons to 6,000 Daltons, preferably having a weight average molecular weight of 250 Daltons to 5,000 Daltons, more preferably having a weight average molecular weight of 500 Daltons to 2,500 Daltons.

Preferably in these embodiments, said fragments comprise up to 30 phenylpropane units on weight average, more preferably, up to 27 phenylpropane units on weight average.

The molecular weight of the three phenylpropanoid monomer precursors varies between 150 Da of coumaryl alcohol, 180 Da of coniferyl alcohol, and 210 Da of synapyl alcohol. The average weight is therefore 180 Da and this value has been used as "phenylpropane unit". The $M_w$ values have been divided by 180 Da, thus obtaining the phenylpropane unit numbers on weight average.

In other embodiments, the lignin fraction comprises fragments having a number average molecular weight ($M_n$) up to 2,000 Daltons.

For the purposes of the present invention, the number average molecular weight ($M_n$) of fragments in the lignin fraction is measured by Size-Exclusion Chromatography.

Preferably, the lignin fraction comprises fragments having a number average molecular weight ($M_n$) up to 1,500 Daltons.

In preferred embodiments, said lignin fraction comprises fragments having a number average molecular weight of 150 Daltons to 1,300 Daltons.

Without wishing to be bound by any theory, it is believed that lower number average molecular weights mean more active molecules. This is put forward considering that lower molecular weights mean smaller fragments, and smaller fragments mean less crosslinked/shorter fragments, and less crosslinked/shorter fragments mean a higher number of free functional groups thereon, thus more reactive fragments.

Moreover, it is believed that smaller molecules can easily pass through the cell membrane of pathogens and diffuse therewithin, thus significantly increasing the overall effectiveness of the lignin fraction.

Preferably in these embodiments, said fragments comprise up to 11 phenylpropane units on number average, more preferably, up to 8 phenylpropane units on number average.

The molecular weight of the three phenylpropanoid monomer precursors varies between 150 Da of coumaryl alcohol, 180 Da of coniferyl alcohol, and 210 Da of synapyl alcohol. The average weight is therefore 180 Da and this value has been used as "phenylpropane unit". The $M_n$ values have been divided by 180 Da, thus obtaining the phenylpropane unit numbers on number average.

In preferred embodiments, said lignin fraction comprises fragments having a weight average molecular weight ($M_w$)

of 150 Daltons to 2,500 Daltons, and fragments having a number average molecular weight ($M_n$) up to 2,000 Daltons.

More preferably, said lignin fraction comprises fragments having a weight average molecular weight ($M_w$) of 150 Daltons to 2,500 Daltons and 2 to 13 phenylpropane units on weight average, and fragments having a number average molecular weight ($M_n$) up to 2,000 Daltons and up to 11 phenylpropane units on number average.

In further embodiments, the lignin fraction has a polydispersity index (PDI) of 1.25 to 6. The polydispersity index (PDI) or heterogeneity index, or simply dispersity, is a measure of the distribution of molecular mass in a given polymer sample. PDI is the weight average molecular weight ($M_w$) divided by the number average molecular weight ($M_n$). It indicates the distribution of individual molecular masses in a batch of polymers.

Particularly preferred embodiments are those wherein said lignin fraction comprises fragments having a weight average molecular weight ($M_w$) of 150 Daltons to 2,500 Daltons and 2 to 13 phenylpropane units on weight average, and wherein said lignin fraction has a polydispersity index of 1.25 to 6.

Particularly preferred embodiments are also those wherein said lignin fraction comprises fragments having a number average molecular weight ($M_n$) up to 2,000 Daltons and up to 11 phenylpropane units on number average, and wherein said lignin fraction has a polydispersity index of 1.25 to 6.

The most preferred embodiments are those wherein said lignin fraction comprises fragments having a weight average molecular weight ($M_w$) of 150 Daltons to 2,500 Daltons and 2 to 13 phenylpropane units on weight average, a number average molecular weight ($M_n$) up to 2,000 Daltons and up to 11 phenylpropane units on number average, and wherein said lignin fraction has a polydispersity index of 1.25 to 6.

In particularly preferred embodiments of the present invention, said lignin fraction comprises fragments having a weight average molecular weight ($M_w$) of 4,400 Daltons to 5,000 Daltons and 24-28 phenylpropane units on weight average, a number average molecular weight ($M_n$) of 1,200 to 1,300 Daltons and 6-7 phenylpropane units on number average.

In other particularly preferred embodiments of the present invention, said lignin fraction comprises fragments having a weight average molecular weight ($M_w$) of 800 Daltons to 1,500 Daltons and 4-8 phenylpropane units on weight average, a number average molecular weight ($M_n$) of 300 to 700 Daltons and 2-4 phenylpropane units on number average. In these particularly preferred embodiments, in said lignin fraction, the most abundant phenylpropane units are those from coniferyl alcohol, whereas the less abundant phenylpropane units are those from synapyl alcohol.

The organic-inorganic hybrid material of the invention preferably comprises a metal compound and a lignin fraction, wherein:
  the metal compound is selected from metal hydroxide, metal oxide, metal halide, metal sulphate, metal nitrate, metal gluconate, metal acetate, metal carbonate, metal oxychloride, and combinations thereof, and the metal is selected from Mg, Ca, Ti, Fe, Mn, Co, Ni, Cu, Zn, Ag, Al, and mixtures thereof,
  the lignin fraction comprises fragments having a weight average molecular weight ($M_w$) of 4,400 Daltons to 6,000 Daltons and 24-33 phenylpropane units on weight average, a number average molecular weight ($M_n$) of 1,200 to 1,300 Daltons and 6-7 phenylpropane units on number average, and wherein the metal compound is embedded in the lignin fraction in an amount up to 50 wt %, based on the weight of the organic-inorganic hybrid material.

Alternatively, organic-inorganic hybrid material of the invention preferably comprises a metal compound and a lignin fraction, wherein:
  the metal compound is selected from metal hydroxide, metal oxide, metal halide, metal sulphate, metal nitrate, metal gluconate, metal acetate, metal carbonate, metal oxychloride, and combinations thereof, and the metal is selected from Mg, Ca, Ti, Fe, Mn, Co, Ni, Cu, Zn, Ag, Al, and mixtures thereof,
  the lignin fraction comprises fragments having a weight average molecular weight ($M_w$) of 800 Daltons to 1,500 Daltons and 4-8 phenylpropane units on weight average, a number average molecular weight ($M_n$) of 300 to 700 Daltons and 2-4 phenylpropane units on number average, and wherein the metal is embedded in the lignin fraction in an amount up to 50 wt %, based on the weight of the organic-inorganic hybrid material.

More preferably, in the organic-inorganic hybrid material of the invention, the metal compound is embedded in the lignin fraction in an amount up to 40 wt %, based on the weight of the organic-inorganic hybrid material.

Particularly preferred are those embodiments wherein the organic-inorganic hybrid material comprises a metal compound and a lignin fraction, wherein:
  the metal compound is selected from brochantite, gerhardtite, goethite, lepidocrocite, or a mixture thereof,
  the lignin fraction comprises fragments having a weight average molecular weight ($M_w$) of 150 Daltons to 5,500 Daltons, said fragments comprising up to 30 phenylpropane units on weight average, and comprises fragments having a number average molecular weight ($M_n$) up to 2,000 Daltons, said fragments comprising up to 11 phenylpropane units on number average, and wherein the metal is embedded in the lignin fraction in an amount up to 40 wt %, based on the weight of the organic-inorganic hybrid material.

In other embodiments, the organic-inorganic hybrid material consists essentially of a metal compound and a lignin fraction, as above described. For the purposes of the present invention, the expression "consists essentially of" means that said metal compound and said lignin fraction are the only active ingredients against harmful and pathogenic microorganisms which are present in the organic-inorganic hybrid material, the possible other components being impurities or unreacted starting materials.

In further embodiments, the organic-inorganic hybrid material consists of a metal compound and a lignin fraction, as above described.

In another aspect, the present invention relates to processes for preparing said organic-inorganic hybrid material.

In first embodiments, the process for preparing the organic-inorganic hybrid material comprises the steps of:
  i) providing a water solution of a metal compound,
  ii) adding the lignin fraction and mixing for at least 1 hour,
  iii) adjusting the pH to 7-8, by adding a base, and
  iv) recovering and drying the resulting organic-inorganic hybrid material.

In step ii), the lignin fraction is preferably added in a weight ratio to the metal up to 5:1.

In step ii), the mixing is preferably performed for 6-24 hours at room temperature.

In another embodiment, in step ii), the mixing is performed for 1-3 hours, more preferably for about 2 hours at room temperature.

In step iii), the base can be any inorganic base, such as $NH_3$ or an ammonium salt, oxide or hydroxide of Li, Na, K, Mg, Ca, Ba, Al, or a mixture thereof. Preferably, the base is Na hydroxide.

In step iv), the recovery is performed preferably by filtering off the solid phase comprising the resulting organic-inorganic hybrid material, and drying at 70-80° C.

Optionally, the filtered solid phase can be washed with water, before being dried. This can be done in order to remove the resulting salt of the base, however, as said resulting salt is not harmful, being conversely a useful ingredient, it is preferred not to wash the filtered solid phase. For example, when the starting metal compound is Cu sulphate and the base is Na hydroxide, the resulting salt is simply $Na_2SO_4$.

In second embodiments, the process for preparing the organic-inorganic hybrid material comprises the steps of:
 a) providing a metal compound and the lignin fraction in a powdered and dry form,
 b) adding a base, thus obtaining a solid mixture,
 c) grinding the solid mixture in a planetary ball mill,
 d) collecting the resulting organic-inorganic hybrid material.

It should be noted that no solvents are present in these second embodiments, and that the process as a whole is performed on a solid and dry state of components.

The base of step b) can be the same as the base of step iii) above, but preferably in a solid state.

The processes above allow to obtain the organic-inorganic hybrid material of the invention, wherein the lignin fraction and the metal compound are intimately mixed.

For instance, when the starting metal compound is Cu sulphate and the base is Na hydroxide, the resulting products are $Na_2SO_4$ and a hybrid material comprising an intimate mixture of lignin fraction and basic salt of Cu, i.e. $Cu_2(SO_4)(OH)_6$.

It should be appreciated that, when the metal in the starting metal compound is Cu, both processes allow to achieve an organic-inorganic hybrid material comprising brochantite, as will be seen in the following working Examples.

The organic-inorganic hybrid material of the invention has unexpectedly and surprisingly proved to be very selective and effective as an antimicrobial agent against harmful and pathogenic microorganisms. Therefore, in another aspect, the present invention relates to the use of said organic-inorganic hybrid material as an anti-microbial agent in agriculture and in human and animal feed.

For the purposes of the present invention, the harmful and pathogenic microorganisms comprise both food pathogens and phytopathogens.

Food pathogens are Gram-positive and Gram-negative bacteria and fungi, such as *Escherichia coli, Candida albicans, Pseudomonas aeruginosa, Staphylococcus aureus, Salmonella enterditis, Campylobacter jejuni, Listeria monocytogenes.*

With the term "phytopathogen" it is meant an organism parasitic on a plant host thus causing soil-borne disease or an infection, said organism being a bacterium, fungus, oomycetes, or virus.

Typical pathogenic bacteria are *Erwinia amylovora, Pseudomonas syringae, Xanthomonas arboricola, Xanthomonas campestris,* typical pathogenic fungi are *Botrytis cinerea, Cercospora beticola, Zymoseptoria tritici, Fusarium solani, Alternaria solani, Rhizoctonia solani, Monilia laxa,* Anthracnose of turfgrass, Apple powdery mildew, Apple scab, Black knot, Black sigatoka, Blackleg of oilseed rape, Brown rot of stone fruits, Dollar spot of turfgrass, Dutch elm disease, Early blight of Potato and Tomato, Ergot of rye, *Fusarium* head blight, *Fusarium* wilt of watermelon and other cucurbits, Leucostoma canker of stone fruits, *Monosporascus* root rot, Mummy Berry, Rice blast, *Septoria tritici* blotch (STB) of wheat, Sudden death syndrome of soybean, Take-all root rot, Tan spot of cereals, *Verticillium* wilt, White mold (*Sclerotinia*), *Armillaria* root disease, shoestring root rot, Brown root rot, Coffee rust, Common smut of corn, Daylily rust, *Rhizoctonia* diseases of turfgrass, Southern blight, southern stem blight, white mold, Soybean rust, Stem rust of wheat, Stinking smut of wheat, Wheat Stem Rust, White pine blister rust, typical pathogenic oomycetes are *Phytophthora infestans, Plasmopara viticola, Aphanomyces* root rot or common root rot of legumes, Black shank of tobacco, Downy mildew of cucurbits, Downy mildew of grape, Late blight of potato and tomato, *Phytophthora* blight of cucurbits, *Phytophthora* root and stem rot of soybean, *Pythium* blight of turfgrass, Sudden oak death and *ramorum* blight, Taro leaf blight, Rapid Blight of Turfgrass, and typical viruses include viroids and virus-like organisms. Most plant viruses have small, single-stranded RNA genomes. However, some plant viruses also have double stranded RNA or single or double stranded DNA genomes. These genomes may encode only three or four proteins: a replicase, a coat protein, a movement protein, in order to allow cell to cell movement through plasmodesmata, and sometimes a protein that allows transmission by a vector. Plant viruses can have several more proteins and employ many different molecular translation methods.

Plant viruses are generally transmitted from plant to plant by a vector, but mechanical and seed transmission also occur. Vector transmission is often by an insect (for example, aphids), but some fungi, nematodes, and protozoa have been shown to be viral vectors. In many cases, the insect and virus are specific for virus transmission such as the beet leafhopper that transmits the curly top virus causing disease in several crop plants.

This means that the organic-inorganic hybrid material of the invention advantageously allows to substitute the antibiotic treatment. Antibiotic-resistance, defined as the emergence (and propagation) of factors of bacterial resistance to antibiotics, is triggered by the selective pressure exerted on microbe populations by an excessive and/or improper use of antibiotics. The organic-inorganic hybrid material as here described has proved to be an effective alternative to the antibiotics for the prevention and treatment of antibiotic-resistant infections.

As it will be seen from the Examples given below, the organic-inorganic hybrid material of the present invention advantageously and surprisingly shows significant antimicrobial properties that allow to improve the overall health and wellness of human and animals, as well as the overall health of plants and crop.

In an additional aspect, the present invention concerns an agro-chemical product comprising the organic-inorganic hybrid material, and agro-chemical additives.

Suitable additives are pH adjusters, acidity adjusters, water hardness adjusters, mineral oils, vegetal oils, fertilizers, leaf manures, and combinations thereof.

Exemplary additives include 2-ethyl hexanol EO-PO, alkoxylated alcohols, alkoxylated fatty amine, alkoxylated triglycerides, alkyl polyglycoside, alkylethersulfate sodium salt, alkylphenolethylene oxide condensate, alkylphenylhydroxypolyoxyethylene, allyl polyethylene glycol methyl ether, amphoteric dipropionate surfactant, di-l-p-menthene, dimethyl polysiloxane, esterified vegetable oil, ethylene oxide condensate, fatty acid esters, fatty alcohol ethylene oxide condensate, fatty alcohol polyalkoxylate, lecithin (soya), methylated rapeseed oil, n-dodecylpyrrolidone, n-methylpyrrolidone, n-octylpyrrolidone, non-ionic surfactant, nonyl phenol ethylene oxide condensate, paraffin oils, poly(vinylpyrrolidione/1-hexadecene, polyacrylamide, polyalkylene glycol, polyalkyleneoxide, polyether modified trisiloxane, polyethylene polypropylene glycol, polyoxyethylene monolaurate, propionic acid, styrene-butadiene copolymer, synthetic latex, tallow amine ethoxylate, vegetable oil, and mixtures thereof.

In view of the fact that the organic-inorganic hybrid material is effective even at very reduced concentrations, the agro-chemical product advantageously and preferably comprises said organic-inorganic hybrid material in an amount so as to have a metal concentration of 5-200 grams per liter of agro-chemical product.

The agro-chemical product can be in a solid or liquid form.

When the agro-chemical product is in a solid form, said solid form can be tablet, mini-tablet, micro-tablet, granule, micro-granule, pellet, multiparticulate, micronized particulate, or powder.

When the agro-chemical product is in a liquid form, said liquid form can be solution, suspension, emulsion, dispersion, drops or sprayable fluid, and can be either a water- or oily-based liquid form. Said liquid form can comprise a solvent. Suitable solvents are water, glycols, alcohols, polyalcohols, organic acids, and combinations thereof.

Preferred solvents are water, methanol, ethanol, n-propanol, iso-propanol, n-butanol, isobutanol, allyl alcohol, 1,2-propylene glycol, 1,3-propylene glycol, 1,2-ethylene glycol, polyethylene glycol (PEG), glycerol, lactic acid, polylactic acid, and mixtures thereof. More preferred solvents are water, 1,2-propylene glycol, 1,3-propylene glycol, 1,2-ethylene glycol, polyethylene glycol (PEG), and mixtures thereof.

Preferably, when the agro-chemical product is in a liquid form, said liquid form has a pH of 5-9, more preferably 6-8.

When the agro-chemical product is in a liquid form, said liquid form comprises 1-50 wt % of the organic-inorganic hybrid material. This means that the agro-chemical product is a concentrate that can be suitably diluted or directly mixed with other chemicals before use, if desired.

Said agro-chemical product can be bait in grains, aerosol cans, liquid (without dilution), bait in bulk, matrices, concentrated bait, fluid concentrate miscible in oils, encapsulated granules, suspension of capsules, dispersible concentrate, powder, powder for dry tanning of seeds, emulsifiable concentrate, electrically chargeable liquid, water-in-oil emulsion, emulsion for tanning of seeds, oil-in-water emulsion, smoky jar, fine granules, smoky candle, smoky cartridge, smoky slat, concentrated suspension for tanning, smoky tablet, smoking agent (fumigant), smoky granules (or pellets), gas (under pressure), granular bait, gasifiable product, microgranular, sliding powder, granular, oil-based paste, hot smoke discharging concentrate, solid/liquid combi packaging, liquid/liquid combi packaging, cold smoke discharging concentrate, solid/solid combi packaging, lacquer, solution for tanning of seeds, microemulsion, microgranular, dispersible oil, concentrated suspension miscible in oil, liquid miscible in oil, oily suspension, paste, flat bait, concentrated paste or gel, pour-on, stick for plants, treated or coated seeds, bait ready to use, spot-on, fragmented bait, concentrated suspension, suspension-emulsion, granular soluble in water, soluble concentrate, film-forming oil, powder soluble in water, soluble powder for tanning seeds, suspension, tablets, technical material, technical concentrate, powder for traces, ultralow volume liquid, hydrodispersible microgranular, hydrodispersible granular, wettable powder, wettable powder for tanning seeds, self-adhesive patch, and combinations thereof.

The agro-chemical product can be applied by one or more of the following procedures:

mixing the agro-chemical product with seeds in a hopper of sowing machine, sprinkling the agro-chemical product next to the sowing furrows, sprinkling the agro-chemical product throughout the field before or after the last soil tillage.

When the agro-chemical product is in a liquid form, it can be applied also by one or more of the following procedures:

spraying the agro-chemical product on tubers, bulbs and seeds, spraying the agro-chemical product on aerial part of the plant, leaves, stems, dipping plant roots in a water solution comprising the agro-chemical product.

Depending on the purposes of the final use, the agro-chemical product is applied in an amount so as to achieve 100 g-1000 kg of organic-inorganic hybrid material per hectare (ha), preferably 100 g-100 kg per ha, more preferably 100 g-1000 g per ha. This means that, the corresponding amount of metal used is surprisingly low. In fact, as it will be seen also in the following working examples, when 3 L/ha (i.e. 300 g/ha) of an organic-inorganic hybrid material comprising 10% Cu were applied, very significant results have been observed on cultivations of strawberries and tomato.

In an additional aspect, the present invention concerns a food product comprising the organic-inorganic hybrid material, and suitable food ingredients.

The term "food product" means any edible product intended for both human and animal nutrition, including flours, baked goods, animal feedstuff, energy drinks, diet bars, edible oils, so-called "breakfast cereals", yogurt, fresh and dried pasta, ice cream, fruit juice or nectars, and sweets.

Preferably, when the food product is in a liquid form, said liquid form has a pH of 2-14, more preferably 5-10, even more preferably 8-11.

In view of the fact that the organic-inorganic hybrid material is effective even at very reduced concentrations, the food product advantageously and preferably comprises said organic-inorganic hybrid material in very reduced amounts. In preferred embodiments of the food product, in particular animal food product, the organic-inorganic hybrid material is in an amount of up to 10 kg per ton of food product, more preferably 1-5 kg per ton of food product.

In another aspect, the present invention concerns a food supplement comprising the organic-inorganic hybrid material, and suitable food carriers.

The food supplement can be in a solid or liquid form.

When the food supplement is in a solid form, said solid form can be tablet, mini-tablet, micro-tablet, granule, micro-granule, pellet, multiparticulate, micronized particulate, or powder.

When the food supplement is in a liquid form, said liquid form can be solution, suspension, emulsion, dispersion, drops or sprayable fluid, and can be either a water- or oily-based liquid form. Said liquid form can comprise a solvent. Suitable solvents are water, glycols, alcohols, polyalcohols, organic acids, oils, fats, and combinations thereof.

Preferred solvents are water, methanol, ethanol, n-propanol, iso-propanol, n-butanol, isobutanol, allyl alcohol, 1,2-propylene glycol, 1,3-propylene glycol, 1,2-ethylene glycol, polyethylene glycol (PEG), glycerol, lactic acid, polylactic acid, and mixtures thereof. More preferred solvents are water, 1,2-propylene glycol, 1,3-propylene glycol, 1,2-ethylene glycol, polyethylene glycol (PEG), and mixtures thereof.

When the food supplement is in a liquid form, said liquid form comprises 5-70 wt % of the organic-inorganic hybrid material. This means that the food supplement is a concentrate that can be suitably diluted or directly mixed with other carriers/ingredients before use, if desired.

In view of the fact that the organic-inorganic hybrid material is effective even at very reduced concentrations, the food supplement advantageously and preferably comprises said organic-inorganic hybrid material in very reduced amounts. In preferred embodiments of the food supplement, in particular animal food supplement, the organic-inorganic hybrid material is in an amount of up to 10 kg per ton of food supplement, more preferably 1-5 kg per ton of food supplement.

Suitable food carriers are acidifying agents, acidity correctors, anti-agglomerants, antioxidants, fillers, resistance agents, gelling agents, coating agents, modified starches, sequestering agents, thickeners, sweeteners, thinners, solvents, disaggregating agents, glidants, dyes, binders, lubricants, stabilizers, adsorbents, preservatives, wetting agents, flavors, film-forming substances, emulsifiers, wetting agents, release retardants and mixtures thereof.

Preferably, the present invention concerns the food supplement for use as antimicrobial agent in the livestock feeding.

With the term "livestock" in the present invention, it is meant to include both ruminant and non-ruminant animals. Ruminants are herbivorous mammals with a four-chambered stomach, who digest otherwise indigestible plant matter by fermenting it in this complex stomach, and who chew the cud (they cough up balls of semi-digested plant matter and re-chew it to break it down before swallowing it again). They include cattle, sheep, goats, deer, antelope, giraffes and camels and their close relatives such as bison, musk oxen, okapi, and lamas. Non-ruminant animals, including pseudo-ruminant animals, can be swine, horses, chickens, rabbits, turkeys, ducks, geese, quails, pheasants, partridges, as well as fish and shellfish. This means that the food supplement of the invention can be advantageously also used in fish and shellfish feeding, i.e. in aquaculture.

Preferably, the present invention concerns the food supplement for use as antimicrobial agent in pet food. Pet food includes dog food, cat food, bird food and fish food.

In other preferred embodiments, the food supplement further comprises at least one resin acid. Preferably, said resin acid is abietic acid, dehydroabietic acid, palustric acid, neoabietic acid, pimaric acid, isopimaric acid, sandaropimaric acid, or an ester thereof, or an ether thereof, or an alkali or alkaline-earth salt thereof, or a mixture thereof.

Preferably, the food supplement comprises up to 10 wt % of said at least one resin acid, more preferably up to 7 wt %, on the weight of the food supplement.

Resin acids are present in coniferous trees, and there are three main species of resin acid products, namely Tall Oil Rosin (TOR), Wood Rosin and GUM Rosin. TOR is the resin acid fraction separated by vacuum distillation from Crude Tall Oil (CTO) which is produced by the preparation of pulp. CTO is obtained via acidulation of Crude Tall Oil Soap or Crude Sulphate Soap (TOS). TOS is separated from cooking liquid in pulp mill often called black liqueur during pulping process. Wood Rosin is the fraction separated by steam distillation or other means from dead trees, tree stumps, branches etc. and GUM Rosin is the resin fraction that has been steam distilled or separated by other means from resin harvested often called tapping from a living tree.

Substances containing resin acids and obtained by vacuum distillation from crude tall oil include Distilled Tall Oil (DTO), Tall Oil Fatty Acid (TOFA) and Tall Oil Pitch (TOP). DTO contains 10-40% of resin acids. CTO typically contains 15-70% of resin acids, and the lowest resin acid contents are generally provided by the cooking of mixed wood pulp.

The term "Tall Oil Rosin" or "TOR" should be understood as referring to a composition obtained by distillation of crude tall oil and further refinement of distilled tall oil. TOR typically comprises 60-99% (w/w) resin acids.

The term "Wood Rosin" should be understood as referring to a composition obtained by distillation or other means from dead trees, tree stumps, branches etc. Wood Rosin typically comprises 50-99% (w/w) resin acids.

The term "GUM Rosin" should be understood as referring to a composition obtained by distillation or separated by other means from resin harvested from a living tree. GUM Rosin typically comprises 50-99% (w/w) resin acids.

The term "Distilled Tall Oil" or "DTO" should be understood as referring to a composition obtained by distillation of crude tall oil and further refinement of distilled tall oil. DTO typically comprises 10-60% (w/w) resin acids.

The resin acid-based composition TOR, Wood Rosin, GUM Rosin, CTO, TOS and DTO can also be produced by mixing one or more resin acid compositions and one or more fatty acid compositions in form of oils or fats. Produced resin acid derivatives are for example esters, ethers or alkali metal salts.

Resin acids are known to show many properties, such as antibacterial, anti-inflammatory, antioxidant and anti-bacterial biofilm properties. However, resin acids are poorly stable over time, especially in solid forms, as they are subjected to oxidation, spontaneous ignition and packing.

It has been surprisingly found that when said at least one resin acid is mixed with the organic-inorganic hybrid material of the invention, the resulting mixture, either solid or liquid, is very stable over time and without oxidation, so that it is possible to fully take benefit of the properties of resin acids. This means that in the resulting food supplement comprising the organic-inorganic hybrid material of the invention, not only resin acids are preserved from degradation, but also a synergistic anti-inflammatory and antimicrobial effect between lignin fraction and resin acids is observed.

The food supplement can also additionally comprise at least one alkali or alkaline-earth salt of fatty acid $C_{12}$-$C_{24}$, at least one biological oil, or a mixture thereof. These biological oil or salt allow a better solubilization of resin acids when liquid form of the food supplement is preferred.

Preferably, said alkali or alkaline-earth salt is a salt of lithium, sodium, potassium, magnesium, calcium, or a mixture thereof.

Preferably, said fatty acid $C_{12}$-$C_{24}$ is lauric acid (C12), tridecylic acid (C13), myristic acid (C14), pentadecylic acid (C15), palmitic acid (C16), margaric acid (C17), stearic acid (C18), oleic acid (C18:1), linoleic acid (C18:2), α-linolenic acid (C18:3), γ-linolenic acid (C18:3), nonadecylic acid (C19), arachidic acid (C20), heneicosanoic acid (C21), behenic acid (C22), tricosylic acid (C23), lignoceric acid (C24), stearidonic acid (C18:4), eicosapentaenoic acid (C20:5), docosahexaenoic acid (C22:6), dihomo-γ-linolenic acid (C20:3), arachidonic acid (C20:4), adrenic acid (C22:4), palmitoleic acid (C16:1), vaccenic acid (C18:1), paullinic acid (C20:1), elaidic acid (Ctrans-18:1), gondoic acid (C20:1), erucic acid (C22:1), nervonic acid (C24:1), mead acid (20:3), or a mixture thereof.

In preferred embodiments, said at least one alkali or alkaline-earth salt of fatty acid $C_{12}$-$C_{24}$ is calcium palmitate, calcium laurate, calcium oleate, calcium soap of palm oil, or a mixture thereof.

Said at least one biological oil comprises a fatty acid, anhydride or ester of fatty acids, triglyceride of fatty acids, or a mixture thereof. Suitable biological oil is hemp oil, canola oil, sunflower oil, olive oil, corn oil, palm oil, coconut oil, pine oil, cottonseed oil, wheat germ oil, soya oil, safflower oil, linseed oil, tung oil, castor oil, soybean oil, peanut oil, rapeseed oil, sesame seed oil, rice germ oil, fish oil, whale oil, marine oil, or a mixture thereof.

Preferably, the food supplement comprises said at least one at least one alkali or alkaline-earth salt of fatty acid $C_{12}$-$C_{24}$, at least one fatty oil, or a mixture thereof in a concentration of 1-100 kg per ton of food supplement.

It should be also understood that all the combinations of preferred aspects of the organic-inorganic hybrid material of the invention, as well as of the food product, food supplement, processes, and uses of the same, as above reported, are to be deemed as hereby disclosed.

All combinations of the preferred aspects of the organic-inorganic hybrid material of the invention, the food supplement, food supplement, processes, and respective uses disclosed above are to be understood as herein described.

Below are working examples of the present invention provided for illustrative purposes.

EXAMPLES $M_w$ and $M_n$ in these Examples have been measured by Size-Exclusion Chromatography according to the following procedure.

"wt %" means weight percentage based on the weight of the organic-inorganic hybrid material, unless otherwise specified.

Reagents and Materials
  Eluent: 0.1 M NaOH, flow 0.5 ml/min
  Calibration for RI detector: Pullulan standards, $M_p$: 100,000-1,080 (six standards), where $M_p$ is peak maximum molecular weight
  Calibration for UV-detector (280 nm): PSS standards, polystyrenesulfonate sodium salt, $M_p$ 65,400-891 (six standards). Standards are dissolved into ultra-pure water, concentration should be approximately 5 mg/ml. Injection volume is 20 μl.
  Quality control samples: lignin with known $M_w$ distribution is used.

Equipment and Instruments
  Dionex Ultimate 3000 Autosampler, column compartment, and pump
  Dionex Ultimate 3000 Diode Array Detector
  Reflective Index detector: Shodex RI-101
  Columns: PSS MCX columns: precolumn and two analytical columns: 1000 Å and 100 000 Å, column material is sulfonated divinylbenzene copolymer matrix.
  Syringe filters 0,45 μm and glass sample bottles for STD samples. Sample filtration: Mini-Uniprep syringeless filter device PTFE or Nylon, 0,45 μm. For prefiltration 5 μm syringe filter if needed.
  Measuring bottles Procedure Preparation of the eluent Ideally, water used to prepare eluents should be high quality deionized water of low resistivity (18 MΩ·cm or better) that contains as little dissolved carbon dioxide as possible. The water must be free of biological contamination (e.g., bacteria and molds) and particulate matter.

Needle washing with 10% MeOH-water

Liquid samples

Strong alkaline liquor samples are diluted 1:100 and filtered with PTFE syringe filters (0,45 μm) to vials. Solid lignin samples are diluted and dissolved into 0.1 M NaOH and filtered with PTFE, 0,45 μm syringe filters. Ready samples are load into autosampler. Injection volume is 20 μl. After samples 1 M NaOH is injected as a sample to clean the column.

Instrument Parameters:
  Flow rate 0.5 ml/min
  Eluent 0.1 M NaOH
  Column oven temperature 30° C.
  Isocratic run
  Run time 48 minutes Solid samples Solid samples (lignin) are dried overnight in an oven at 60° C., if needed. Approximately 10 mg is weighed into a 10-ml measuring bottle. Sample is dissolved and diluted into 0.1 M NaOH solution and filled into a mark. Sample is filtered with PTFE, 0,45 μm filters. If sample does not dissolve properly, it can be put in a ultrasound water bath or sample can be filtered through a 5 μm syringe filter.

Standard samples for calibration

Approximately 50 mg of each standard is weighed into a 10-ml measuring bottle and ultrapure water is added and filled into a mark. Standards are filtered with PTFE 0,45 μm syringe filters. After running the calibration samples, calibration results are integrated and processed in the processing method and saved. Calibration is linear 1st order calibration.

Quality control samples

For lignin samples, lignin with known $M_w$ distribution is used as a quality control sample. Lignin is dissolved into 0.1 M NaOH and the concentration is approximately 1 mg/ml.

Example 1

Organosolv lignin obtained from Beech wood (*Fagus sylvatica*) was subjected to a base-catalysed depolymerization ('BCD'). The BCD process is run at 280° C. and 250 bar for 8 minutes at pH 12-14. The resulting lignin product consisted of a liquid fraction and a solid fraction.

These fractions were then separated.

The liquid lignin fraction was an oil and had the following characteristics:

Single Species: *Fagus sylvatica*

| $M_w$ | 100-300 Da (1-2 phenylpropane units) |
|---|---|
| phenols | 0% |
| guaiacols | 15-20% |
| syringols | 50-60% |
| catechols and metoxycatecols | 5-10% |
| oligomers/unknown | 15-30% |

The solid lignin fraction had the following characteristics:
Single Species: *Fagus sylvatica*

| $M_w$ | 800-1,500 Da (4-8 phenylpropane units) |
|---|---|
| $M_n$ | 300-700 Da (2-4 phenylpropane units) |

Structures of OH-groups:

| aliphatic | 0.2-0.4 mmol/g |
|---|---|
| carboxylic | 0.3-0.5 mmol/g |
| condensated and syringyl | 1.0-2.0 mmol/g |
| guaiacyl | 0.4 mmol/g |
| catecholic and p-OH-phenyl | 1.0-1.8 mmol/g |

This solid lignin fraction is shortly referred to as "MMW".

Example 2

The following lignin fraction has been extracted from Kraft black liquor, said lignin fraction having the following characteristics:
>95% of total solids
Single Species: Southern Pine

| $M_w$ | 4400-5000 Da (24-28 phenylpropane units) |
|---|---|
| $M_n$ | 1200-1300 Da (6-7 phenylpropane units) |

Structures of OH-groups:

| aliphatic | 2.1 mmol/g |
|---|---|
| carboxylic | 0.5 mmol/g |
| condensated and syringyl | 1.7 mmol/g |
| guaiacyl | 2.0 mmol/g |
| catecholic and p-OH-phenyl | 4.0 mmol/g |

This solid lignin fraction is shortly referred to as "HMW".
Instruments used in the following working examples:
Inductively Coupled Plasma (ICP)
X-ray powder diffraction analysis (XRPD)
Environmental Scanning Electron Microscopy (ESEM)
Energy Dispersive X-ray Analysis (EDX)
Transmission Electron Microscopy (TEM)

Copper content was measured by inductively coupled plasma atomic emission spectrometry (ICP-AES) analysis. 100 mg of solid sample were suspended in 5 mL of HNO3 65% and 1 mL of $H_2O_2$ 30%, then digested in a Milestone microwave MLS-1200 MEGA (digestion sequence: 1 min at 250 watts, 1 min at 0 watt, 5 min at 250 watts, 5 min at 400 watt, 5 min at 650 watt, 5 min of cooling). The solutions were diluted to 50 mL with bi-distilled water and analyzed by using an emission spectrometer JY 2501 with coupled plasma induction in radial configuration HORIBA Jobin Yvon (Kyoto, Japan), ULTIMA2 model. Instrumental features: monochromator Model JY 2501; focal length 1 m; resolution 5 pm; nitrogen flow 2 l/min. ICP source: nebulizer Meinhard, cyclonic spraying chamber; argon flow 12l/min; wavelengths range 160-785 nm; optical bench temperature 32° C. The wavelength used for quantitative analysis was chosen by examining the emission line with greater relative intensity, ensuring that there was no spectral interference with the Argon emission lines. Acquisition parameters: wavelength Cu (nm): 224.700; Voltage (V): 580; gain: 100. The quantitative analysis was performed after the acquisition of a calibration line using standard solutions in HNO3 at 10%, to simulate the final acidity of the samples; the concentration range of the standards varied from 1 mg/L to 100 mg/L. Data acquisition and processing were performed using the ICP JY v 5.2 software (Jobin Yvon).

Infrared (IR) spectra were recorded with a Nicolet SPCFT-IR spectrophotometer equipped with ATR accessory, range 4000-400 cm-1. Aliquots of the samples were pulverised in a mortar before data acquisition.

Powder X-ray Diffraction (PXRD) analysis was performed on a Thermo ARL X'tra diffractometer with Cu Kα radiation.

Electron diffraction experiments were carried out by using a Philips TECNAI F20 transmission electron microscope (TEM) operating at 200 kV. The samples were ground, suspended in isopropyl alcohol, and then a few drops of the solution were evaporated on a copper or gold grid coated with an amorphous carbon film.

ESEM analysis was performed by an instrument Quanta™ 250 FEG (FEI, Hillsboro, OR) equipped with an energy-dispersive spectrometer (EDS) for X-ray microanalysis (Bruker Nano GmbH, Berlin, Germany), operating in low vacuum mode (70 Pa). The EDS has a QUANTAX XFlash® 6|30 Detector with energy resolution ≤126 eV FWHM at Mn Kα.

Example 3

1 g of HMW of Example 2 was mixed with a water solution of $CuSO_4.5H_2O$, as shown in the Table below:

| Ex. | HMW | $CuSO_4 \cdot 5H_2O$ |
|---|---|---|
| 3a | 1.0 g | 0.12 g |
| 3b | 1.0 g | 0.25 g |
| 3c | 1.0 g | 0.50 g |
| 3d | 1.0 g | 0.80 g |
| 3e | 1.0 g | 1.12 g |
| 3f | 1.0 g | 2.75 g |

The pH was adjusted to 7-8 by using NaOH 1 M, added dropwise. The mixture was stirred for 24 hours at room temperature, then the solid was filtered off, washed with water and air dried. The powder was oven-dried at 70-80° C.; the weight loss was on average 5%.

The resulting organic-inorganic hybrid material was characterized by:
  Inductively Coupled Plasma (ICP) to determine metal content after microwave-digestion of the powder
  X-ray powder diffraction analysis (XRPD)
  Environmental Scanning Electron Microscopy (ESEM)
  Energy Dispersive X-ray Analysis (EDX)
  Transmission Electron Microscopy (TEM)

ICP analysis revealed, for each sample of organic-inorganic hybrid material prepared, the following metal content:

| Ex. | Cu content | Organic-inorganic hybrid material |
|---|---|---|
| 3a | 2.3 wt % | HMW-Cu 2% |
| 3b | 4.3 wt % | HMW-Cu 4% |
| 3c | 9.8 wt % | HMW-Cu 10% |
| 3d | 14.3 wt % | HMW-Cu 14% |
| 3e | 17.3 wt % | HMW-Cu 17% |
| 3f | 41.7 wt % | HMW-Cu 42% |

XRPD and TEM analyses revealed the exclusive presence in all the samples tested of the same copper-containing phase, irrespectively of the % of copper uploaded in the organic-inorganic hybrid material (FIG. 1).

Figure 2:
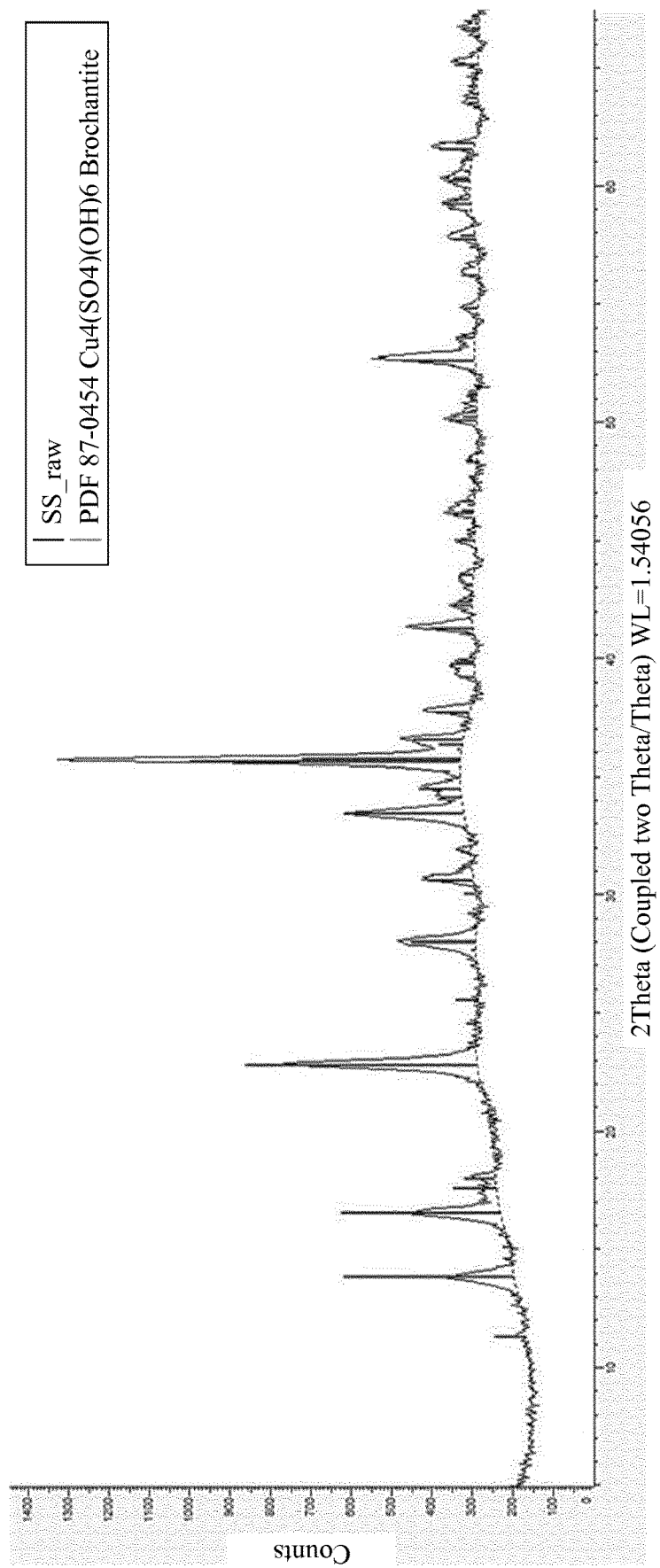
FIG. 2 shows the matching overlap between XRPD plot of HMW-Cu 42% and Brochantite (thin lines, from mineral database), as per Example 3.

A comparison of XRPD plots with a mineral database [Helliwell, M.; Smith, J. V. Brochantite. Acta crystallog. C, 1997, 53, 1369-1371] allowed to identify the recurring mineral phase as Brochantite, with chemical formula $Cu_4SO_4(OH)_6$, embedded in the lignin matrix (FIG. 2, showing the matching overlap between HMW-Cu 42% and Brochantite).

Figure 3:
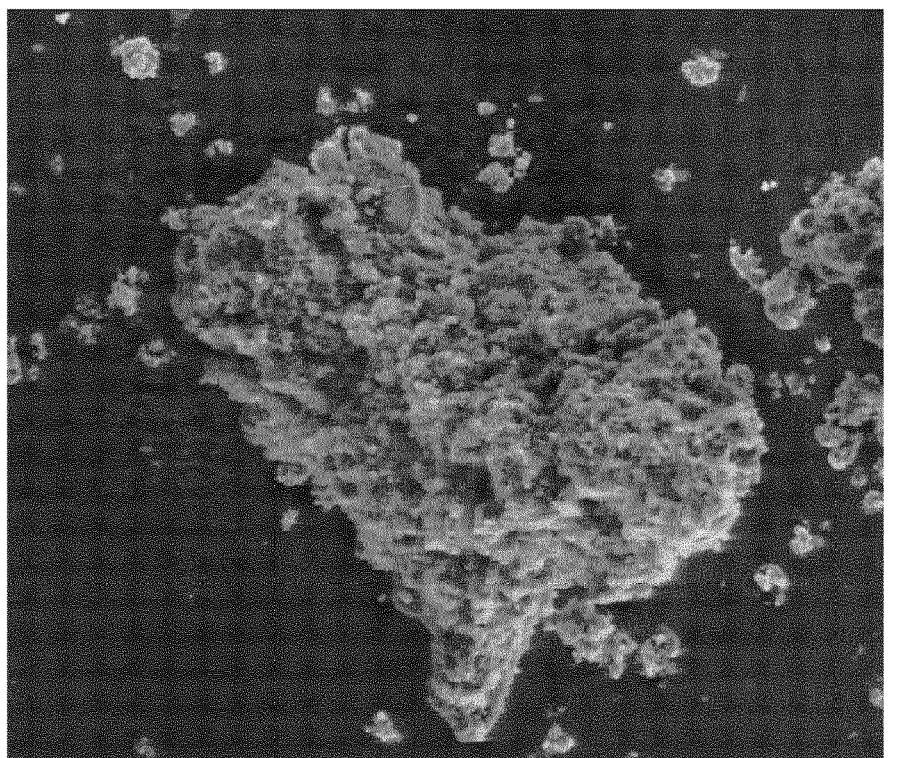
FIG. 3 shows the ESEM images of a granule of HMW-Cu 40% at 20 µm (a) and 10 µm (b) scale-unit, as per Example 3.
Figure 3:
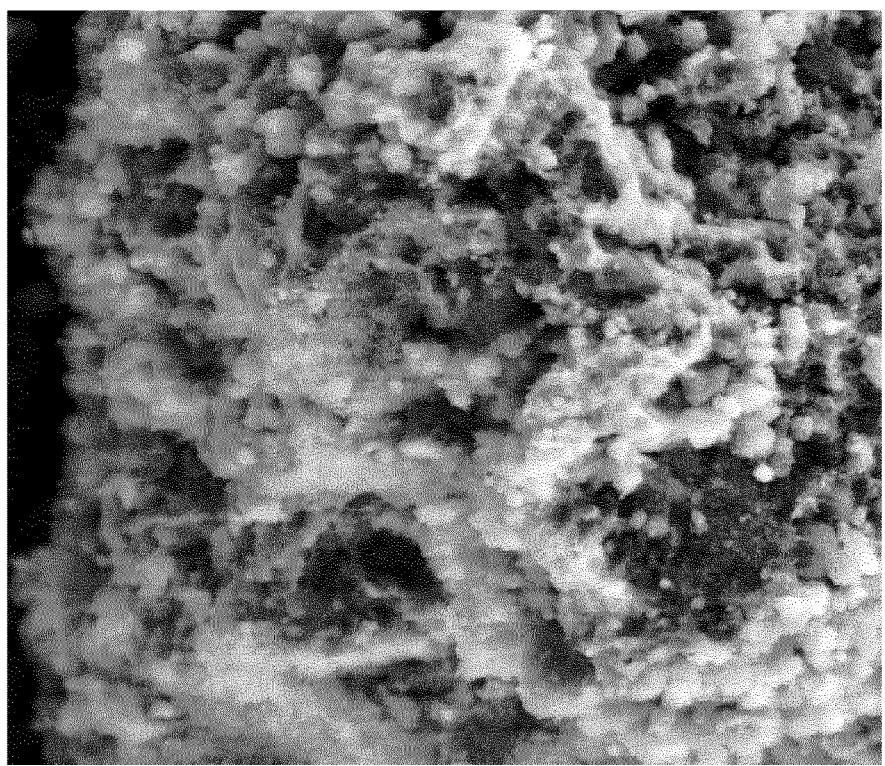

ESEM analysis was performed on samples containing various metal content. As an example, in FIG. 3 the images of a sample containing 17 wt % of copper (HMW-Cu 17%) as Brochantite, from 20 μm to 10 μm scale-unit, are reported.

Figure 4:
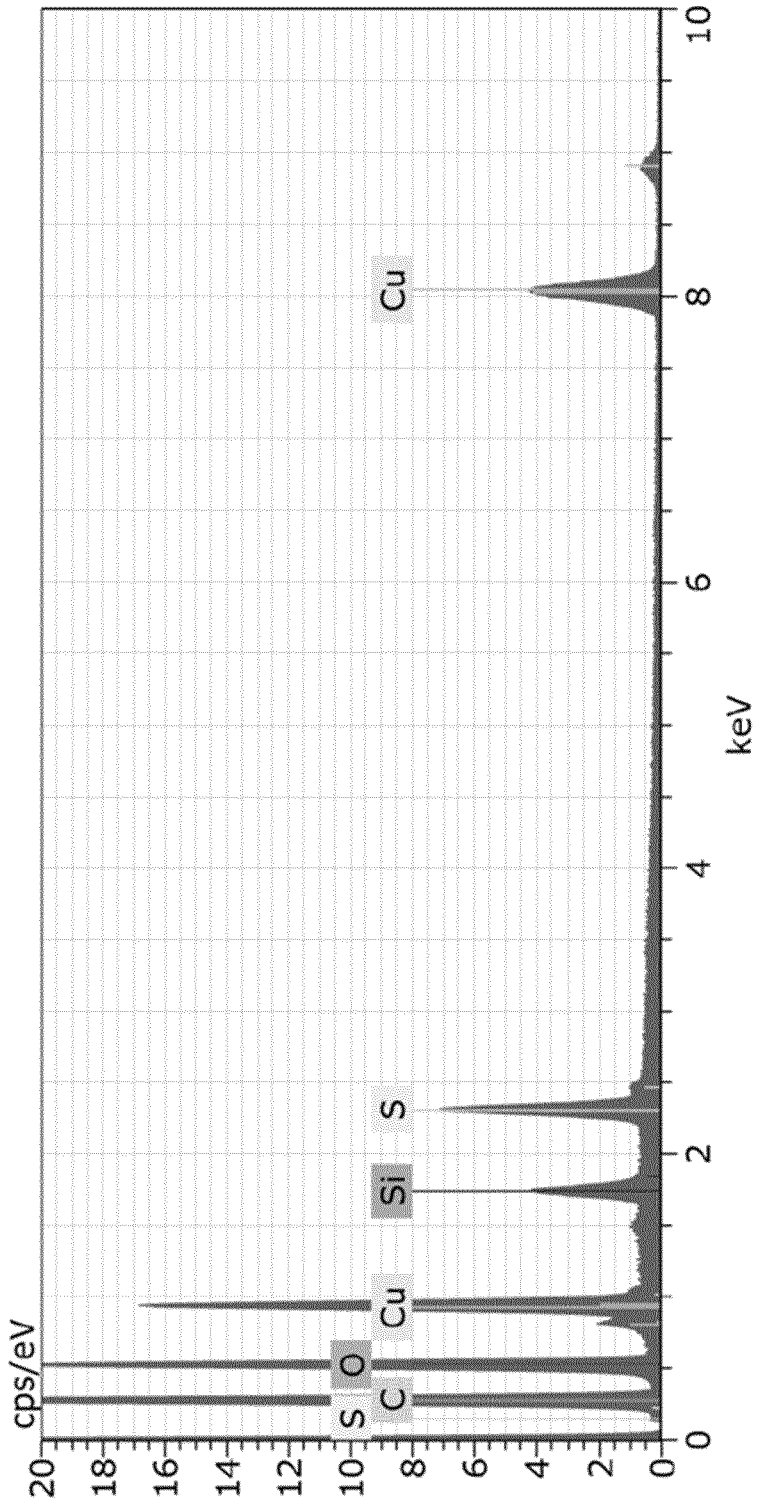
FIG. 4 shows the EDX analysis on a spot of the granule of HMW-Cu 17%, as per Example 3.

EDX analysis confirmed the presence of copper; moving on the granule surface, the metal appears homogeneously distributed on all the granule. FIG. 4 is an EDX spectrum showing the result of the elemental analysis in situ on a spot of the granule of HMW-Cu 17%.

TEM analysis was used to analyse samples of HMW-Cu with various copper content.

This technique allows to acquire nanometric images and even to generate in situ electron diffraction patterns. The images were collected in bright field mode and STEM (Scanning Transmission Electron Microscopy) mode.

Figure 5:
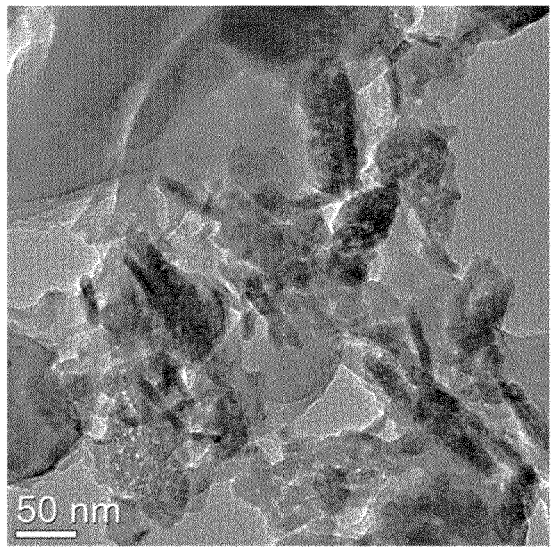
FIG. 5 shows the TEM images in bright field mode (A) and STEM mode (B) of HMW-Cu 14%, from 100 nm (left) to 50 nm (right) scale-unit, as per Example 3.
Figure 5:
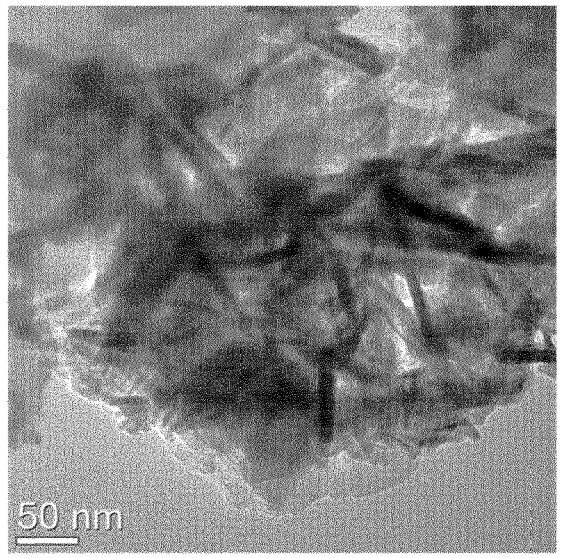
Figure 5:
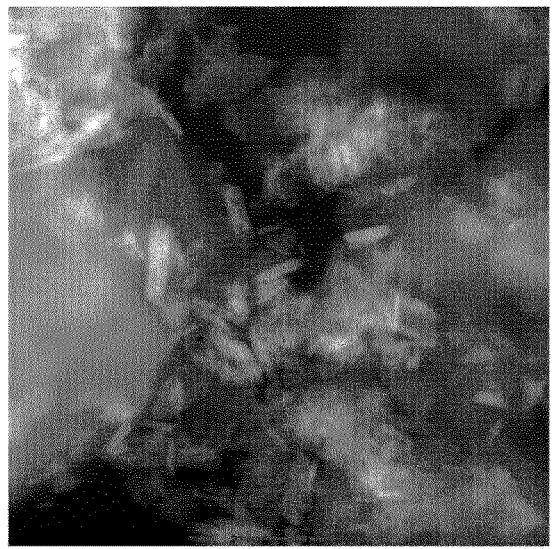
Figure 5:
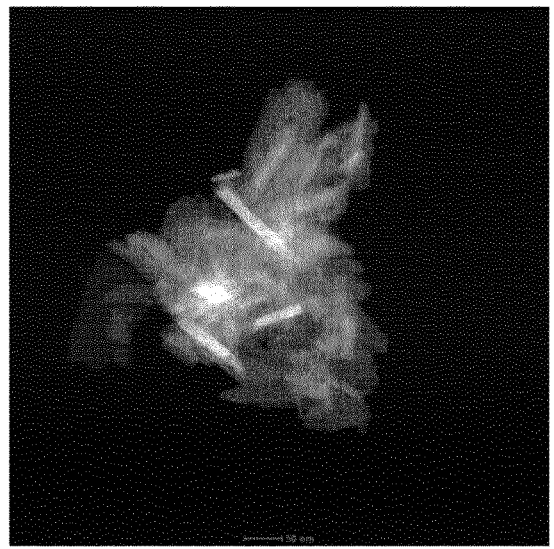

As an example, in FIG. 5, images in both bright field and STEM mode are reported for a sample containing 14% of copper (HMW-Cu 14%) as Brochantite, as stated by ICP.

Small sticks (nanometric scale) are blended with the granular lignin matrix. Diffraction patterns show that these sticks are small crystals of Brochantite. The sticks have a width of 25 nm (on average).

Figure 6:
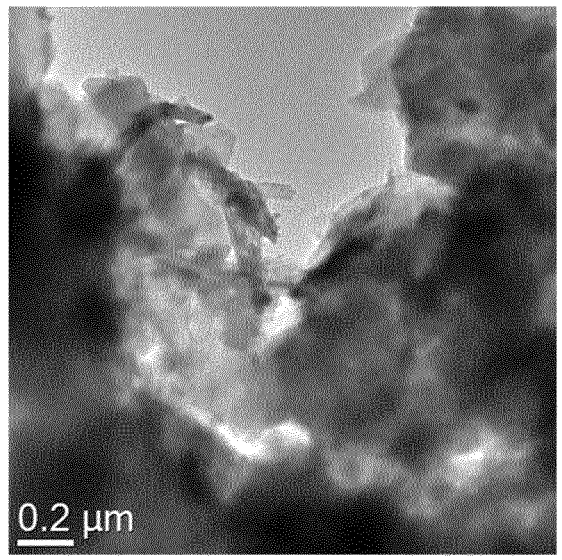
FIG. 6 shows the TEM images in bright field mode (A) and STEM mode (B) of HMW-Cu 2%, from 200 nm (left) to 20 nm (right) scale-unit, as per Example 3.
Figure 6:
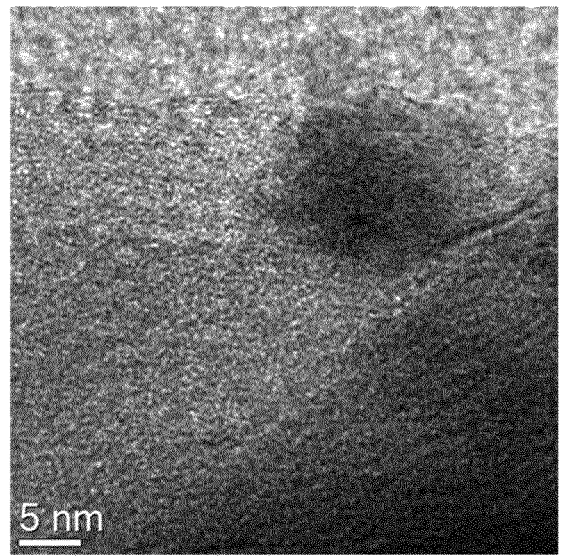
Figure 6:
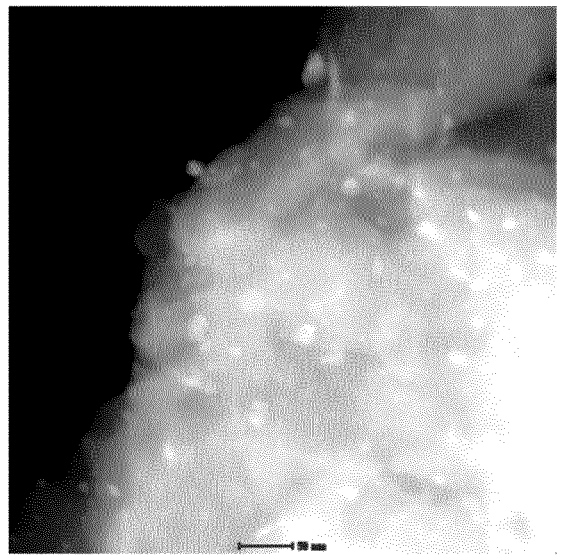
Figure 6:
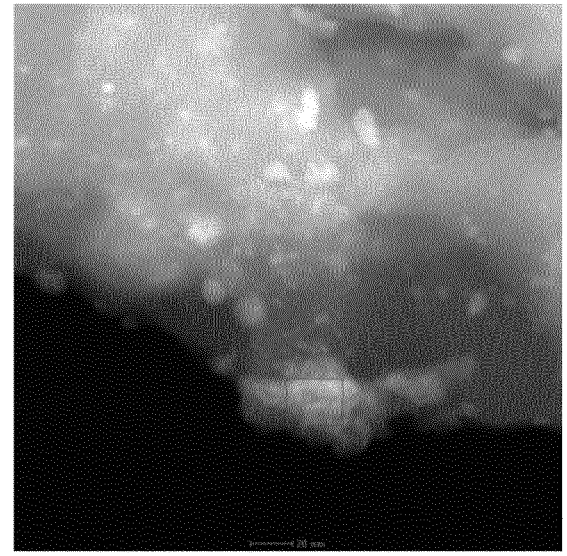
Figure 7:
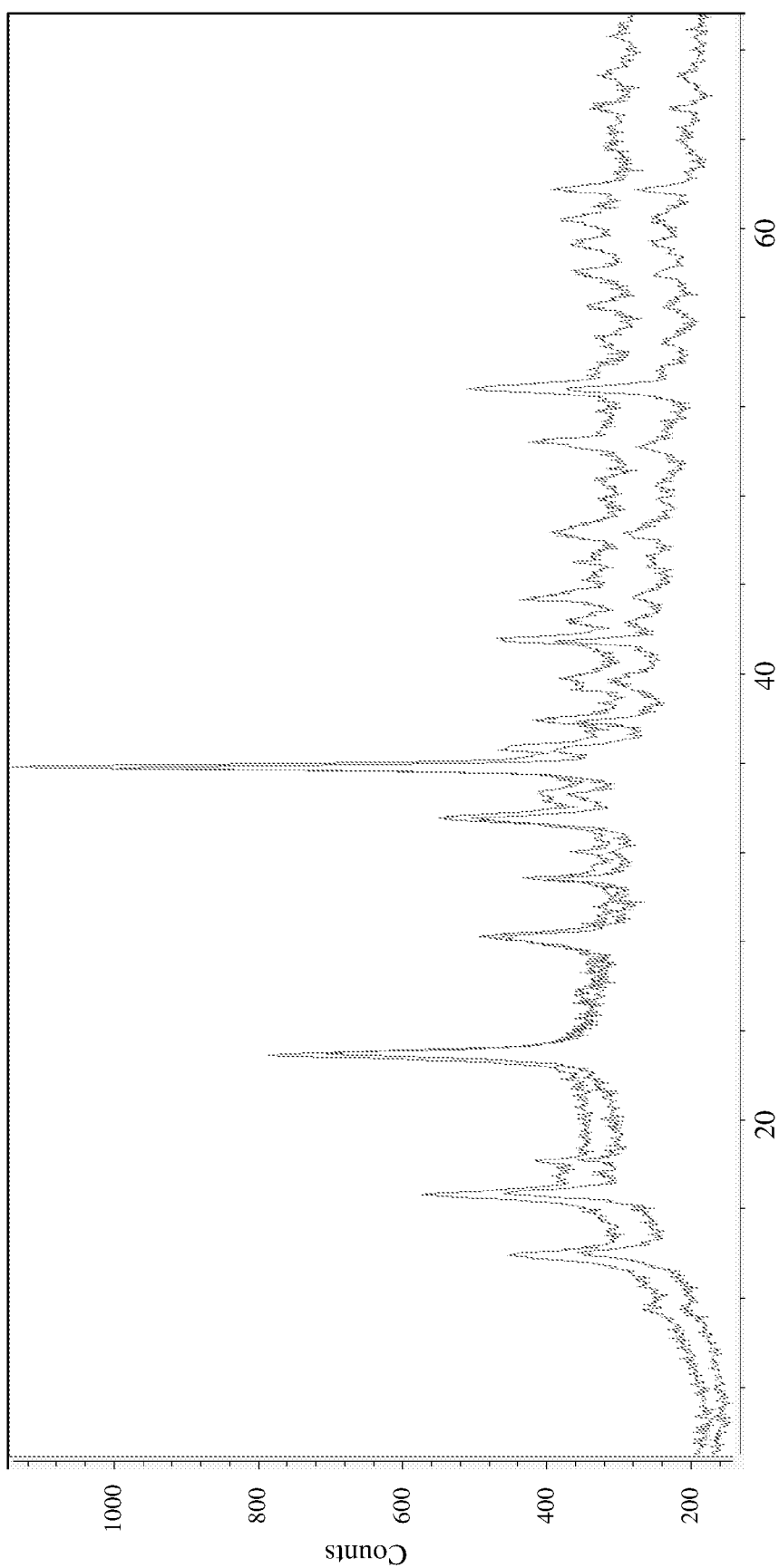
FIG. 7 shows the XRPD plots of HMW-Cu 17% and MMW-Cu 18%, as per Example 4.

TEM analysis was performed also on a sample containing 2% of copper (HMW-Cu 2%), as determined by ICP. In this case, the images (FIG. 6) show the presence of nanometric spheres scattered on the granules. The spheres, with a diameter of about 10 nm, appeared composed of Brochantite, as stated by electron diffraction pattern collected in situ.

Metal Release in Water at Various pH Values

To test the metal release in water at various pH values, about 250 mg of HMW-Cu 18% were stirred in 25 mL of buffer for 24 hours at room temperature. The suspended solids were filtered away to collect the filtrate and, after drying, the metal content determined by ICP. Results are reported in the following table:

|  | Weight (mg) | mg Cu | mg Cu in solution | % release |
|---|---|---|---|---|
| pH 4 | 250 | 45 | 41 | 91 |
| pH 5 | 251 | 45 | 42 | 93 |
| pH 7 | 255 | 46 | 0.06 | 0.1 |
| Distilled water | 257 | 46 | 0.13 | 0.3 |

The copper release at acidic pH is almost complete, while at neutral pH or in distilled water (pH 6-6.5) it is negligible. These data suggest that in the agricultural application the pH of the soil could have a great influence on the sample activities and controlled release can be obtained as a function of pH.

Example 4

1 g of MMW of Example 1 was mixed with a water solution of $CuSO_4.5H_2O$, as shown in the Table below:

| Ex. | MMW | $CuSO_4 \cdot 5H_2O$ |
|---|---|---|
| 4a | 1.0 g | 0.12 g |
| 4b | 1.0 g | 0.25 g |
| 4c | 1.0 g | 0.5 g |
| 4d | 1.0 g | 0.8 g |
| 4e | 1.0 g | 1.12 g |

The pH was adjusted to 7-8 by using NaOH 1 M, added dropwise. The mixture was stirred for 24 hours at room temperature, then the solid was filtered off and washed with water, then air-dried. The powder was further oven-dried at 70-80° C.; the weight loss was on average 5%.

The resulting organic-inorganic hybrid material was characterized by:
Inductively Coupled Plasma (ICP) to determine metal content after microwave-digestion of the powder;
X-ray powder diffraction analysis (XRPD)
Environmental Scanning Electron Microscopy (ESEM)
Energy Dispersive X-ray Analysis (EDX)
Transmission Electron Microscopy (TEM)

ICP analysis revealed, for each sample of organic-inorganic hybrid material prepared, the following metal content:

| Ex. | Cu content | Organic-inorganic hybrid material |
|---|---|---|
| 4a | 2.2 wt % | MMW-Cu 2% |
| 4b | 4.1 wt % | MMW-Cu 4% |
| 4c | 9.7 wt % | MMW-Cu 10% |
| 4d | 14.4 wt % | MMW-Cu 14% |
| 4e | 17.9 wt % | MMW-Cu 18% |

Figure 8:
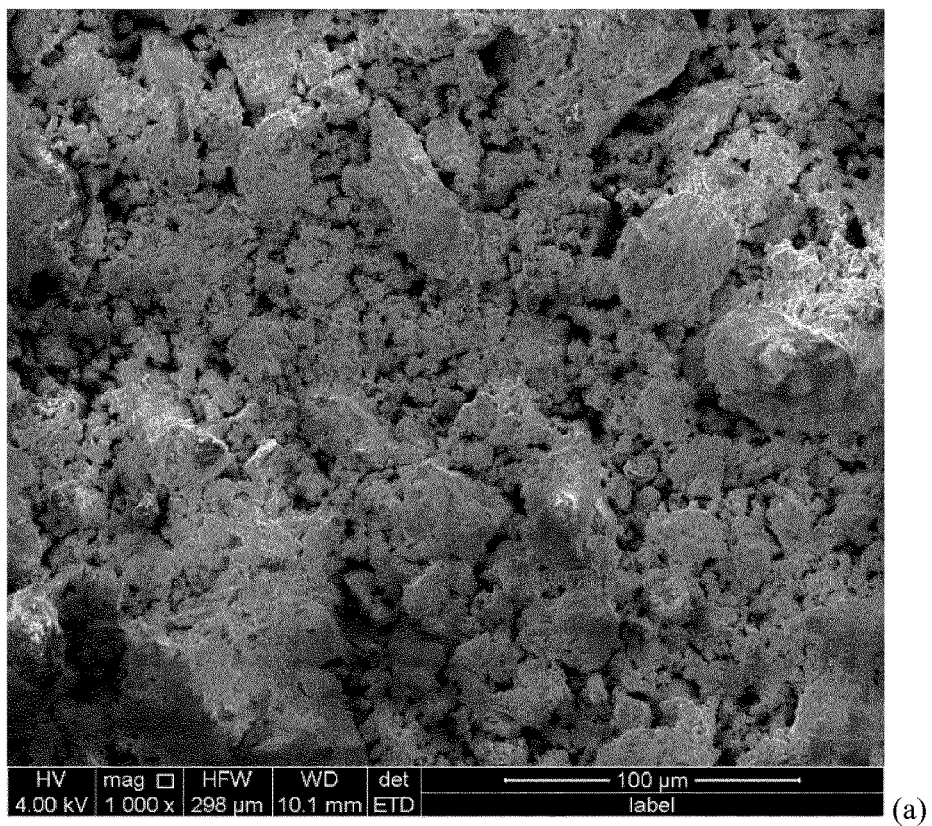
FIG. 8 shows the ESEM images of MMW-Cu 18% from 100 µm (a) to 1 µm (b) scale-unit, as per Example 4.
Figure 8:
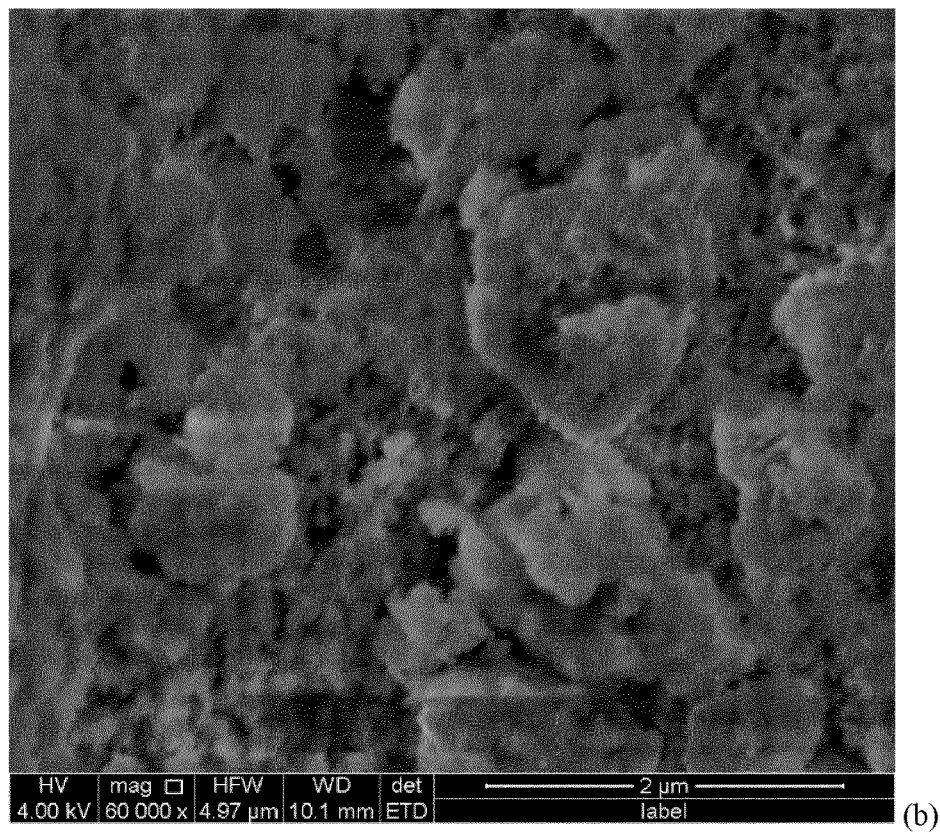

XRPD and TEM analyses revealed the exclusive presence in all the samples tested of the same copper-containing phase, independently of the % of copper uploaded in the organic-inorganic hybrid material. The crystalline phase is the same as described in Example 3 (FIG. 8). A comparison of XRPD plots with a mineral database [Helliwell, M.; Smith, J. V. Brochantite. Acta crystallog. C, 1997, 53, 1369-1371] allowed to identify the recurring mineral phase as Brochantite, with chemical formula $Cu_4SO_4(OH)_6$, embedded in the lignin matrix.

ESEM analysis was performed on samples containing various metal content. As an example, in FIG. 8 the images of a sample containing 18% of copper (MMW-Cu 18%) as Brochantite, from 100 μm to 2 μm scale-unit, are reported.

Figure 9:
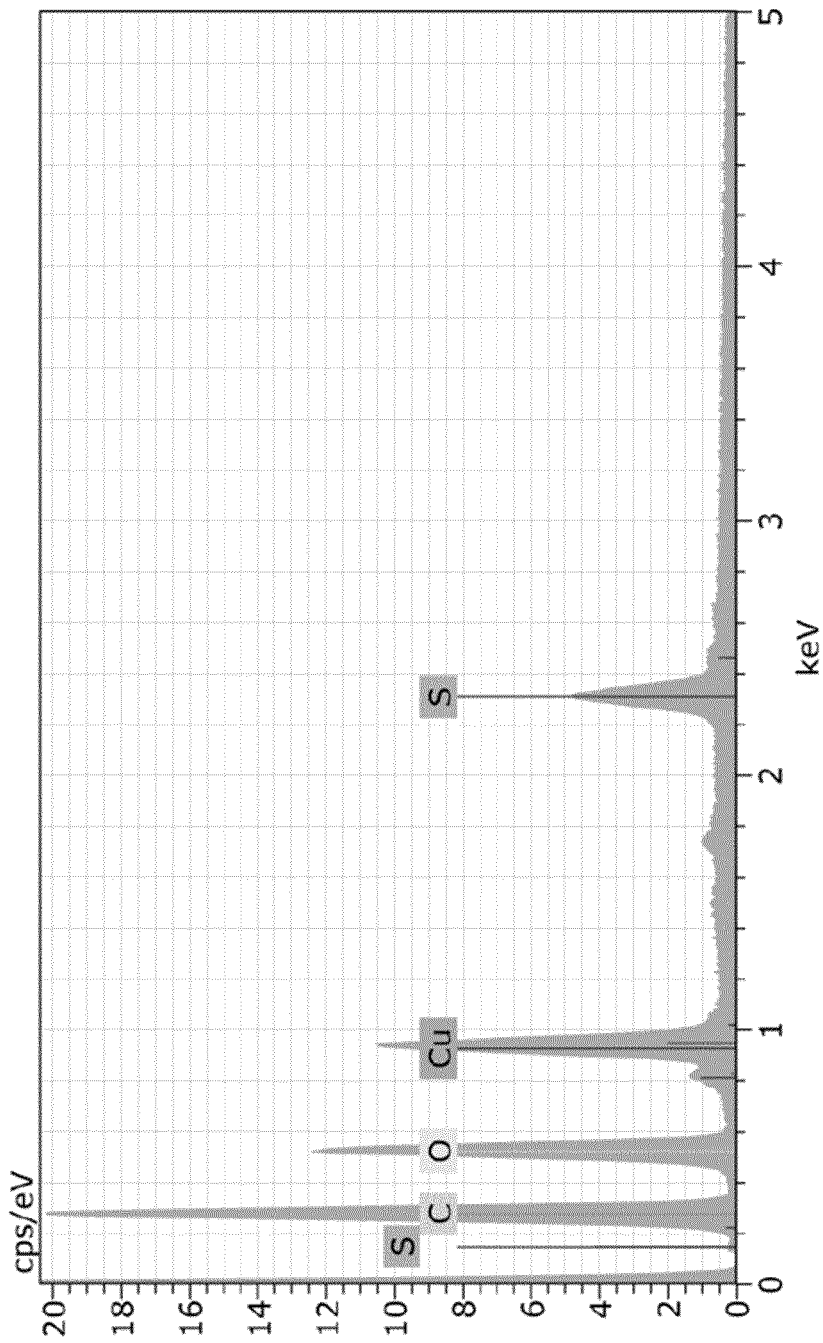
FIG. 9 shows the EDX analysis on a spot of the granule of HMW-Cu 17%, as per Example 4.

The EDX analysis confirmed the presence of copper; moving on the granule surface, the metal appears distributed on all the granule. FIG. 9 is a spectrum showing the result of the elemental analysis in situ on a spot of the granule of MMW-Cu 18%.

TEM analysis was performed on a sample containing 14% of copper (MMW-Cu 14%), as determined by ICP.

Figure 10:
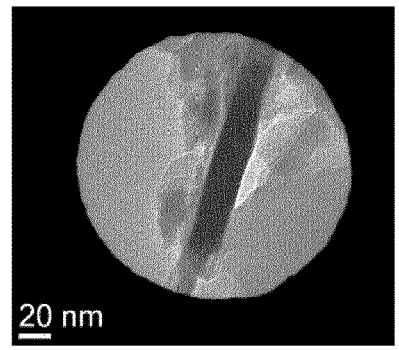
FIG. 10 shows a crystal of Brochantite in MMW-Cu 14%, as per Example 4.

High-resolution diffraction and phase-contrast (HREM) images, electronic diffraction techniques on selected area (SAED), and energy dispersion X-ray spectroscopy techniques (EDX) were used. In FIG. 10, a crystal of MMW-Cu 14% can be observed on a 20 nm scale-unit. SAED analysis confirmed the crystalline phase to be Brochantite.

Figure 11:
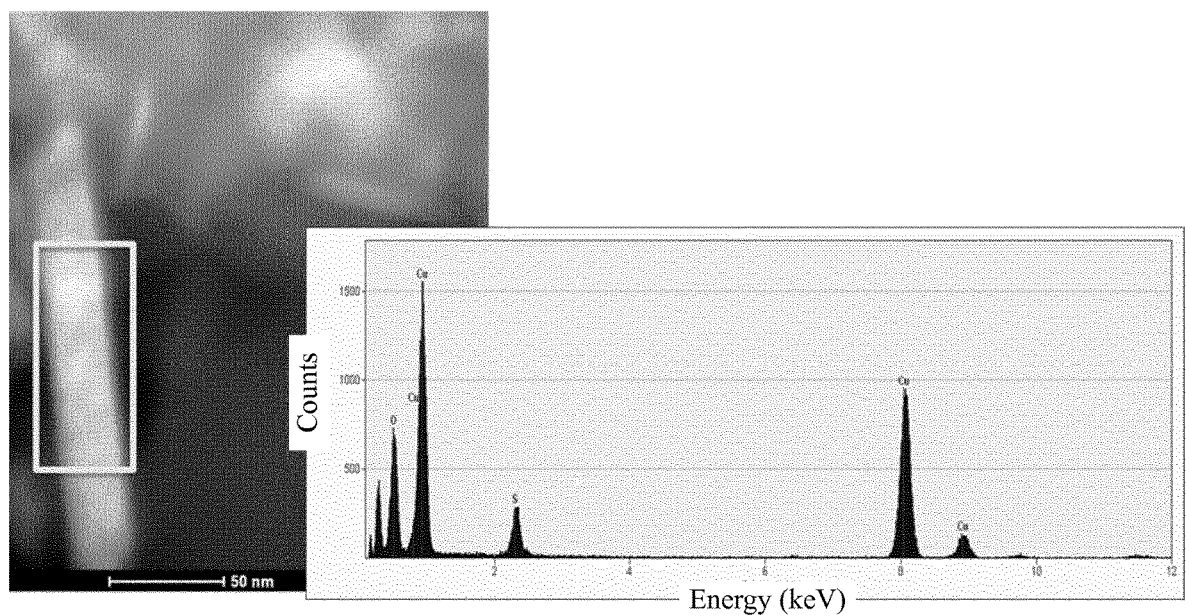
FIG. 11 shows a STEM image of a crystal of Brochantite embedded in the MMW matrix (MMW-Cu 14%), with X-ray microanalysis on selected area, as per Example 4.

In FIG. 11, a STEM image of a crystal of Brochantite embedded in the MMW matrix (MMW-Cu 15%) is shown, with X-ray microanalysis on selected area.

Figure 12:
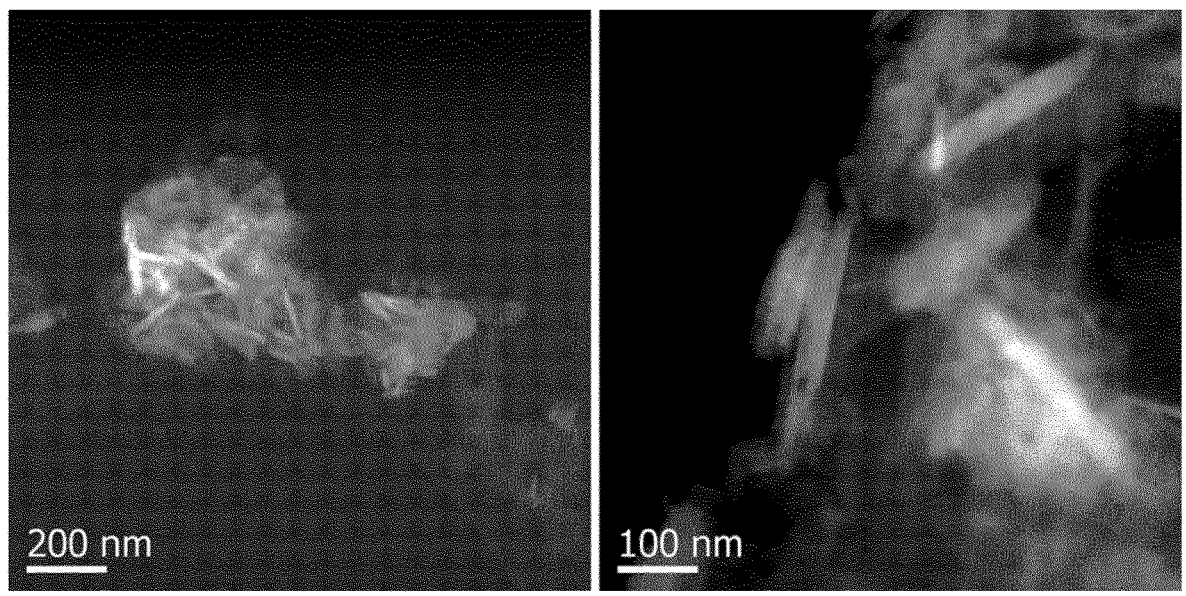
FIG. 12 shows STEM images of crystals of Brochantite (in white) in MMW-Cu 14%, as per Example 4.

In FIG. 12, crystals of Brochantite (in white) in MMW-Cu 14% are shown.

Metal Release in Water at Various pH Values

To test the metal release in water at various pH values, about 250 mg of MMW-Cu 18% were stirred in 25 mL of buffer for 24 hours at room temperature. The suspended solids were filtered away to collect the filtrate and, after drying, the metal content determined by ICP. Results are reported in the following table:

|  | Weight (mg) | mg Cu | mg Cu in solution | % release |
|---|---|---|---|---|
| pH 4 | 257 | 46 | 41 | 89 |
| pH 5 | 250 | 45 | 36 | 80 |
| pH 7 | 255 | 46 | 0.07 | 0.1 |
| Distilled water | 260 | 46 | 0.05 | 0.1 |

The copper release at acidic pH is almost complete, while at neutral pH or in distilled water (pH 6-6.5) it is negligible. These data suggest that in the agricultural application the pH of the soil could have a great influence on the sample activities and controlled release can be obtained as a function of pH.

Example 5

1 g of HMW of Example 2 was mixed with a water solution of $Cu(NO_3)_2 \cdot 3H_2O$, as shown in the Table below:

| Ex. | HMW | $Cu(NO_3)_2 \cdot 3H_2O$ |
|---|---|---|
| 5a | 1.0 g | 0.5 g |
| 5b | 1.0 g | 1.2 g |

The pH was adjusted to 7-8 by using NaOH 1 M, added dropwise. The mixture was stirred for 24 hours at room temperature, then the solid was filtered off and washed with water, then air-dried. The powder was further oven-dried at 70-80° C.; the weight loss was on average 5%.

The resulting organic-inorganic hybrid material was characterized by:
Inductively Coupled Plasma (ICP) to determine metal content after microwave-digestion of the powder;
X-ray powder diffraction analysis (XRPD)

ICP analysis revealed, for each sample of organic-inorganic hybrid material prepared, the following metal content:

| Ex. | Cu content | Organic-inorganic hybrid material |
|---|---|---|
| 5a | 11.3 wt % | HMW-Cu 11% |
| 5b | 24.4 wt % | HMW-Cu 24% |

Figure 13:
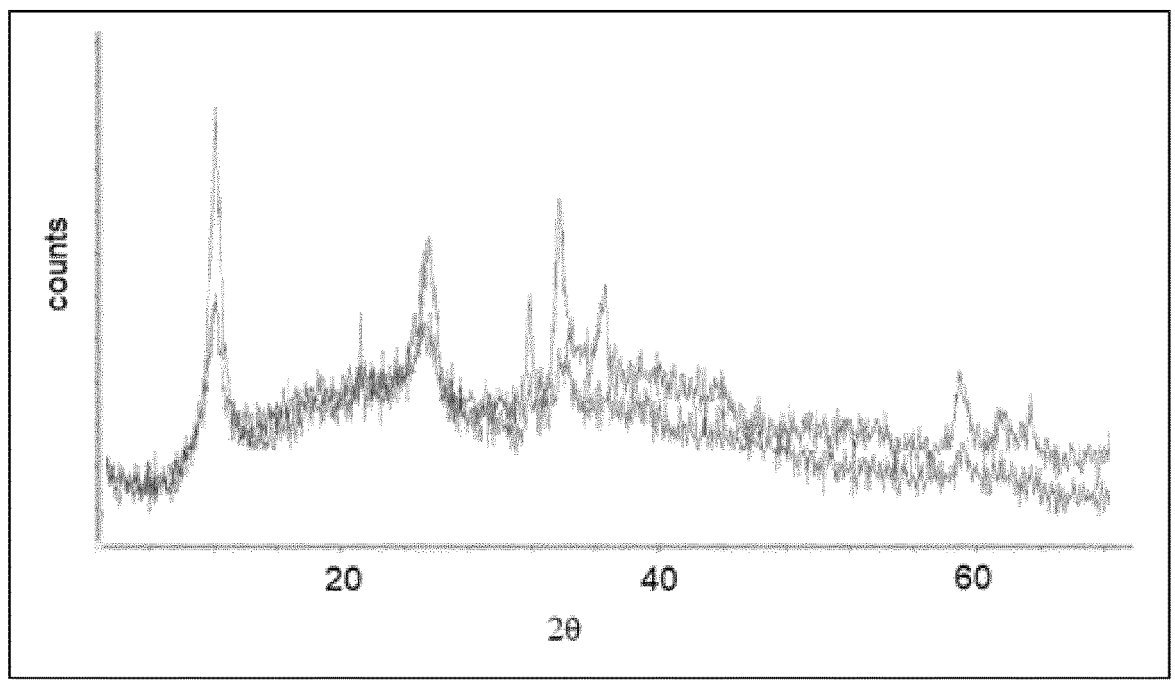
FIG. 13 shows the XRPD plots of HMW-Cu 11% and HMW-Cu 20% obtained from $Cu(NO_3)_2 \cdot 3H_2O$, as per Example 5.

XRPD analyses showed the appearance of a mineral phase, the same in the prepared samples independently from the lignin/salt ratio (FIG. 13). A comparison of these XRPD plots with the mineral database Helliwell, M.; Smith, J. V. Brochantite. *Acta crystallog. C*, 1997, 53, 1369-1371 allowed to identify the recurring mineral phase as gerhardtite, with formula $Cu_2(OH)_3NO_3$.

Example 6A

With the perspective of an industrial scale-up of the sample preparation, preparations of mechanochemical syntheses (solvent-free conditions) were performed. 1 g HMW and 1.2 g of $CuSO_4 \cdot 5H_2O$ in their powder forms were vigorously grinded together in a planetary ball mill in presence of NaOH (300 mg).

Figure 14:
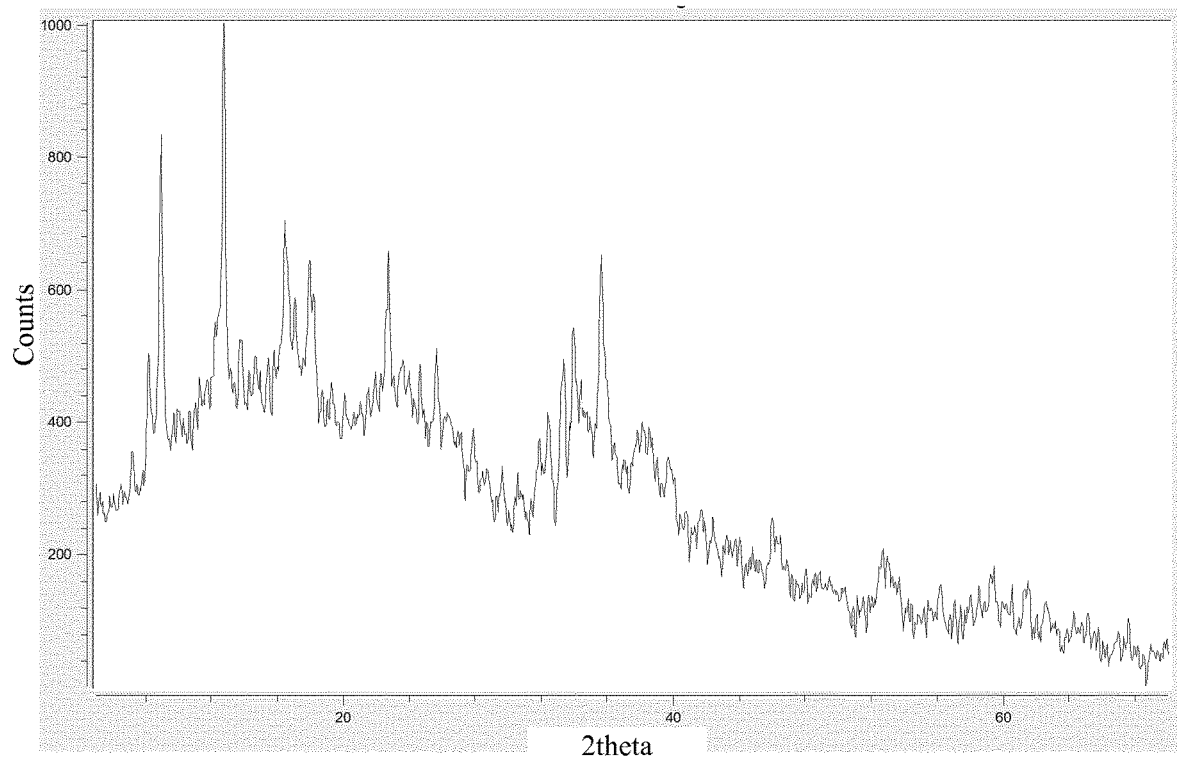
FIG. 14 shows the XRPD trace of HMW-Cu 20% obtained by using mechanochemical techniques, as per Example 6A.

An agate grinding jar equipped with balls of the same material was used. The sample was collected and washed with water, to remove traces of unreacted salt. XRPD analysis of the resulting organic-inorganic hybrid materials was performed, indicating the formation of Brochantite (FIG. 14).

Example 6B

With the perspective of an industrial scale-up of the sample preparation, mechanochemical syntheses (solvent-free conditions) were performed. 1 g HMW and 1.2 g of $CuSO_4 \cdot 5H_2O$ in their powder forms were vigorously grinded together in a planetary ball mill in presence of $Ca(OH)_2$ (280 mg).

An agate grinding jar equipped with balls of the same material was used. The sample was collected and washed with water, to remove traces of unreacted salt. XRPD analysis of the resulting aggregates was performed, indicating the formation of Brochantite and gypsum ($CaSO_4 \cdot 2H_2O$).

Example 7

1 g MMW of Example 1 and 1.2 g of $CuSO_4 \cdot 5H_2O$ in their powder forms were vigorously grinded together in a planetary ball mill in presence of NaOH (300 mg).

Figure 15:
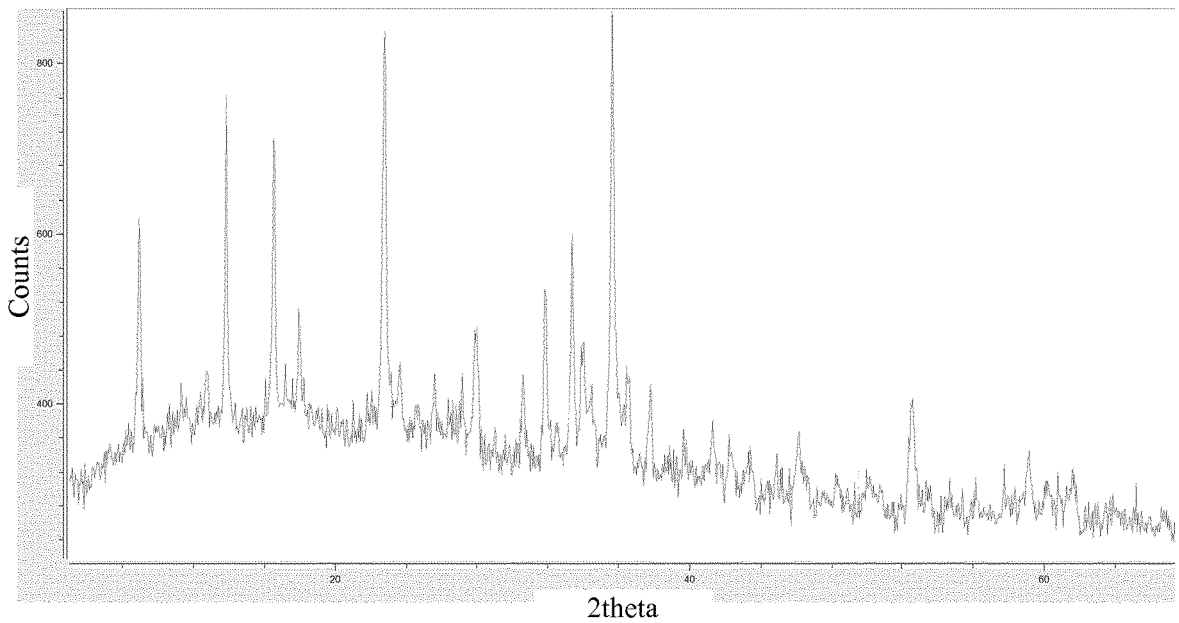
FIG. 15 shows the XRPD trace of MMW-Cu 21% obtained by using mechanochemical techniques, as per Example 7.

An agate grinding jar equipped with balls of the same material was used. The sample was collected and washed with water, to remove traces of unreacted salt. XRPD analysis of the samples was performed, indicating the formation of Brochantite (FIG. 15).

Example 8

1 g of HMW of Example 2 was mixed with a water solution of $FeSO_4 \cdot 7H_2O$, as shown in the Table below:

| Ex. | HMW | $FeSO_4 \cdot 7H_2O$ |
|---|---|---|
| 8a | 1.0 g | 0.25 g |
| 8b | 1.0 g | 0.5 g |
| 8c | 1.0 g | 0.8 g |
| 8d | 1.0 g | 1.2 g |

Two equivalents of NaOH 1 M were gradually added dropwise. The mixture was stirred for 24 hours at room temperature, then the solid was filtered and washed with water, then air-dried; the solid was further oven-dried at 80° C. for 30 hours.

ICP analysis revealed, for each sample of organic-inorganic hybrid material prepared, the following metal content:

| Ex. | Fe content | Organic-inorganic hybrid material |
|---|---|---|
| 8a | 5.7 wt % | HMW-Fe 6% |
| 8b | 7.8 wt % | HMW-Fe 8% |
| 8c | 15.1 wt % | HMW-Fe 15% |
| 8d | 20.2 wt % | HMW-Fe 20% |

Figure 16:
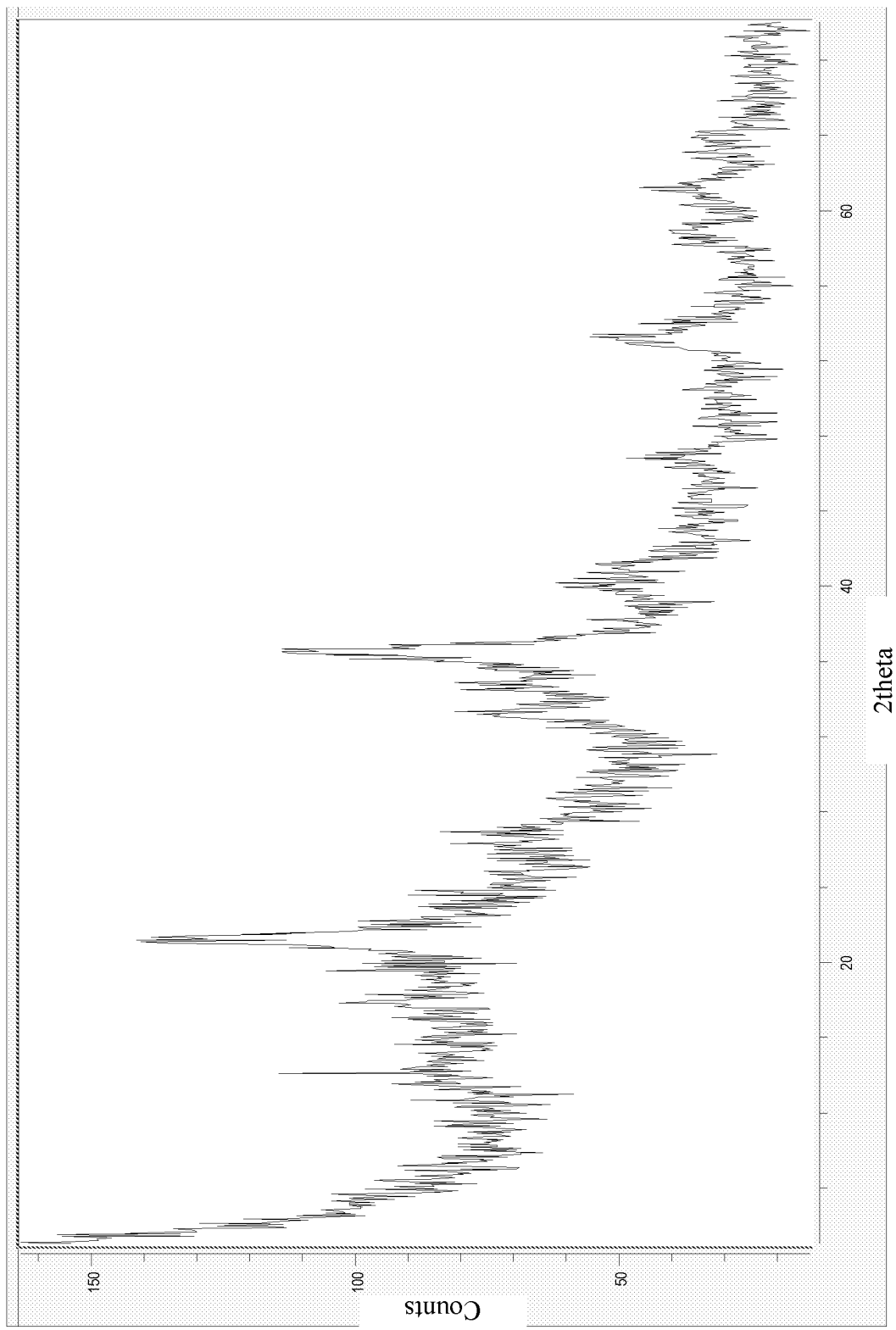
FIG. 16 shows the XRPD trace of HMW-Fe 20%, as per Example 8.

XRPD analyses revealed the presence of a crystalline phase, even if most samples indicate low crystallinity (FIG. 16).

Figure 17:
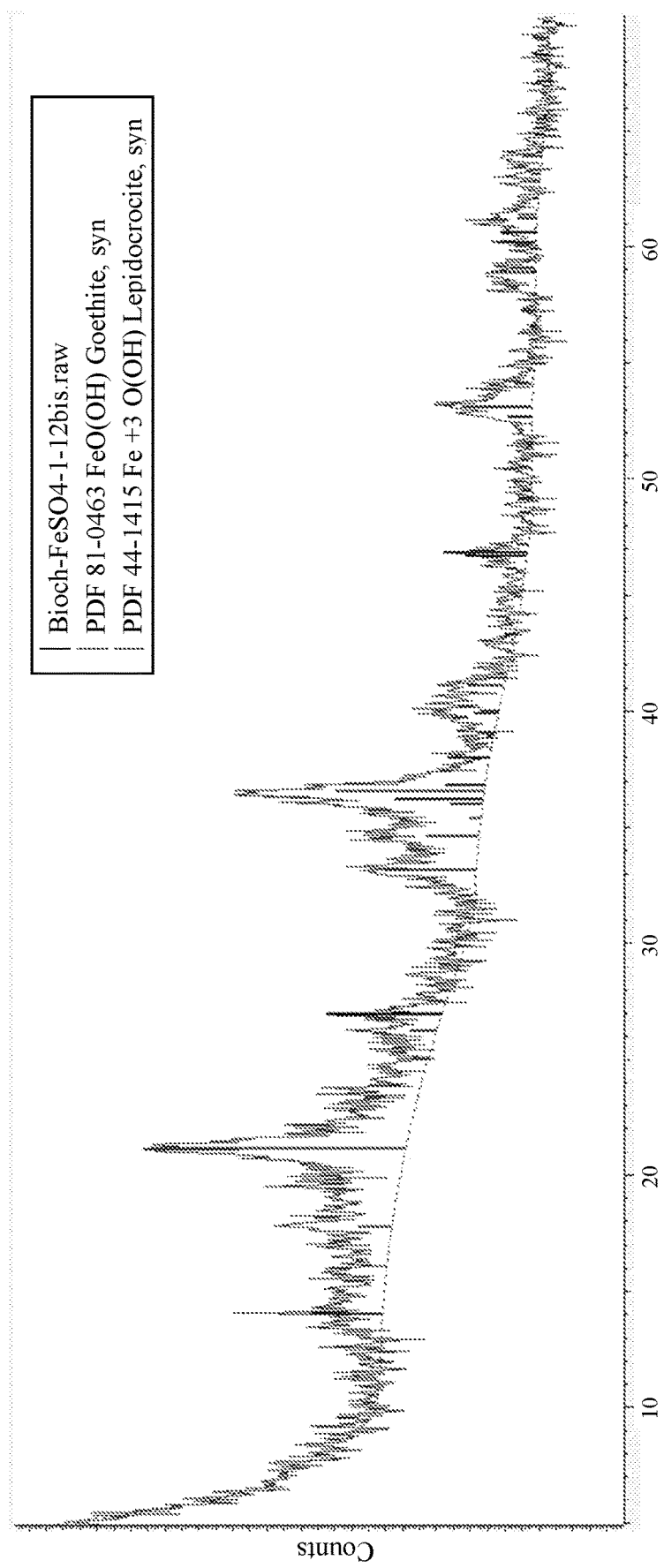
FIG. 17 shows the matching overlap between XRPD plot of HMW-Fe 20%, Goethite and Lepidocrocite (thin lines, from the database), as per Example 8.

A comparison of XRPD plots with the mineral database [Helliwell, M.; Smith, J. V. Brochantite. Acta crystallog. C, 1997, 53, 1369-1371] allowed to hypothesize that the mineral phase is FeO(OH), crystallized as a mixture of two polymorphs, namely Goethite and Lepidocrocite (FIG. 17).

Metal Release in Water at Various pH Values

To test the metal release in water at various pH, aliquots of samples containing 20% of Fe (HMW-Fe 20%) were stirred in water or buffer for 2 hours at room temperature. The suspended solids were filtered away to collect the filtrate, which was analyzed by ICP to determine the iron content. Results are reported in the following table. Interestingly, the iron upload appears stable at acidic and neutral pH.

| | Sample | Weight (mg) | mg Fe | mg Fe in solution | % release |
|---|---|---|---|---|---|
| pH 4 | HMW-Fe 20% | 194.90 | 40.3 | 0.223 | 0.6 |
| pH 7 | HMW-Fe 20% | 149.64 | 31.0 | 0.0050 | 0.02 |
| Distilled water | HMW-Fe 20% | 205.82 | 42.6 | 0.0146 | 0.03 |

Example 9

1 g of HMW of Example 2 was mixed with a water solution of $CuSO_4.5H_2O$, as shown in the Table below:

| Ex. | HMW | $CuSO_4 \cdot 5H_2O$ |
|---|---|---|
| 3c | 1.0 g | 0.50 g |

The pH was adjusted to 7-8 by using NaOH 1M, added dropwise. The mixture was stirred for 2 hours at room temperature, then the solid was filtered off, washed with water and air dried. The powder was oven-dried at 70-80° C. overnight.

The resulting organic-inorganic hybrid material was characterized by:
Inductively Coupled Plasma (ICP) to determine metal content after microwave-digestion of the powder
X-ray powder diffraction analysis (XRPD)
Transmission Electron Microscopy (TEM)
ICP analysis revealed the following metal content:

| Ex. | Cu content | Organic-inorganic hybrid material |
|---|---|---|
| 3c | 11.45 wt % | HMW-Cu 10% |

Figure 18:
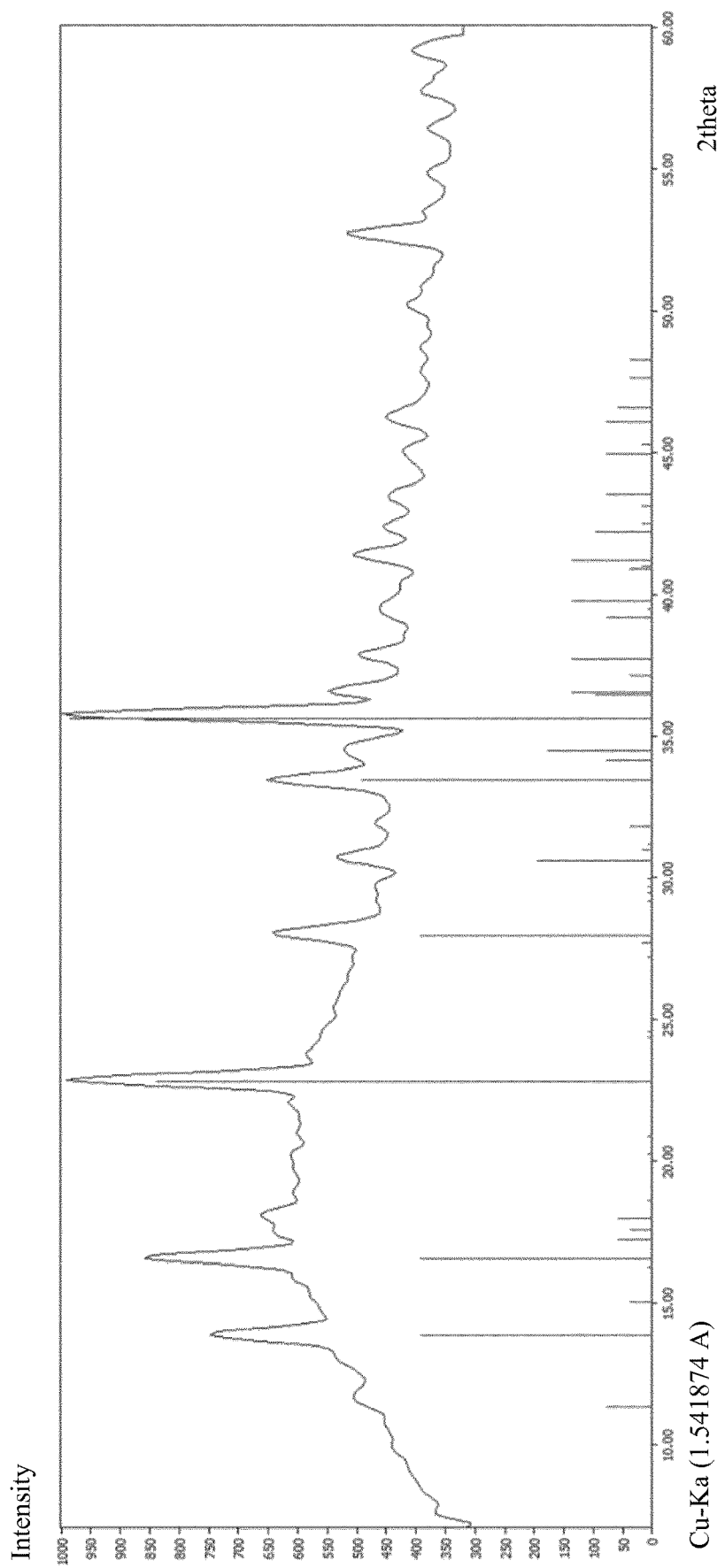
FIG. 18 shows the XRPD plot of the product HMW-Cu obtained in aqueous medium after 2 hours of reaction with 10% of copper, red trace is Brochantite, as per Example 9.
Figure 19:
FIG. 19 shows a) selected area electron diffraction (SAED) collecting on an area of 200 nm, b) and c) STEM images of HMW-Cu 10% Cu, 2 h, as per Example 9.

XRPD and TEM analyses revealed the exclusive presence of the same copper-containing phase (FIGS. 18 and 19). TEM analysis was used to analyse sample of HMW-Cu with 10% of copper obtained in 2 hours. This technique allows to acquire nanometric images and even to generate in situ electron diffraction patterns. The images were collected in bright field mode and STEM (Scanning Transmission Electron Microscopy) mode (FIG. 19).

With reference to FIG. 19, small sticks (nanometric scale) are blended with the granular lignin matrix. Diffraction patterns show that these sticks are small crystals of Brochantite. The sticks have a width of 20 nm (on average) and a length within 50 and 200 nm.

Example 10

620.35 mg of HMW was introduced in an agate jar of 80 ml with 310.2 mg of $CuSO_4.5H_2O$ and 69.4 mg of $Ca(OH)_2$. Then 1 ml of water was added to the mixture. The water content corresponds to 50 wt % referred to the mass of the end material HMW-Cu. The reaction was conduct with a planetary ball mill in order to obtain the hybrid material through mechanochemistry. The parameters used for the synthesis are resumed in the Table below.

| Number of spheres | Diameter of spheres | Revolutions per minute | Time of grinding |
|---|---|---|---|
| 5 | 10 mm | 300 | 2 h (with inversion of rotation after 1 h) |

The solid was filtered off, washed with water and air dried. The powder was oven-dried at 70-80° C. overnight.

Figure 20:
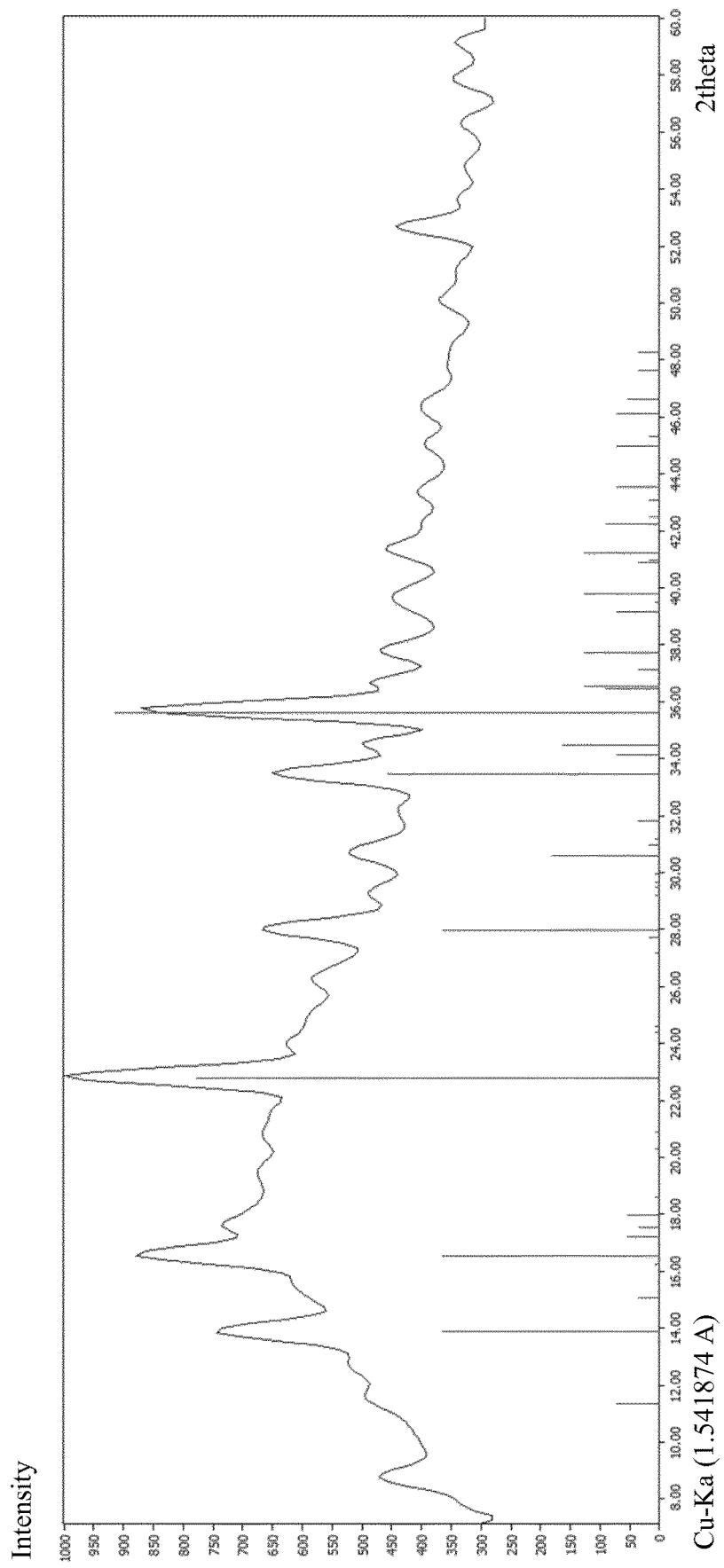
FIG. 20 shows the XRPD plot of the product HMW-Cu obtained in wet condition with mechanochemistry using $Ca(OH)_2$ as base. Red trace is Brochantite.

The resulting organic-inorganic hybrid material was characterized by X-Ray Powder Diffraction Analysis (XRPD) which confirms the formation of the same copper-containing phase (FIG. 20).

Example 11

Antimicrobial Activity

The antimicrobial activity of organic-inorganic hybrid materials of the present invention was evaluated through in vitro test of antimicrobial susceptibility with broth microdilution method and agar dilution method (CLSI protocol—Clinical and Laboratory Standards Institute). The aim was to measure quantitatively the in vitro activity of the organic-inorganic hybrid materials against a given microbial isolate hence to individuate the minimum inhibitory concentration.

Agar dilution assay was used: the organic-inorganic hybrid materials were incorporated at different concentrations into the agar medium (specific for each microorganism) and after solidification of the medium, the inoculum (104 CFU/ml for the fungi and 105 CFU/ml for the bacteria) was applied to the agar surface.

Broth microdilution assay: the organic-inorganic hybrid materials were diluted into specific liquid media in the presence of a well-defined microbial suspension (104 CFU/ml for the fungi and 105 CFU/ml for the bacteria).

In the broth microdilution assay, the organic-inorganic hybrid materials were diluted into specific liquid media, but they resulted insoluble with the formation of precipitates on the bottom of the wells, consequently the MIC were mainly determinate with agar dilution assay.

The organic-inorganic hybrid materials tested were:
Lignin—High molecular weight (HMW)
Lignin—Medium molecular weight (MMW)
Copper hydroxide (copper)
HMW-Cu with 2,6% of copper content (w/w) (HMW-Cu 2)

HMW-Cu with 5,6% of copper content (w/w) (HMW-Cu 6)
HMW with 10% of copper content (w/w) (HMW-Cu 10)
MMW with 2,2% of copper content (w/w) (MMW-Cu 2)
MMW with 4% of copper content (w/w) (MMW-Cu 4)
MMW with 9,3% of copper content (w/w) (MMW-Cu 9)
The MICs were determined for the following harmful and pathogenic microorganisms: Bacteria and fungi (basic and food related screening):
*Escherichia coli*
*Pseudomonas aeruginosa*
*Staphylococcus aureus*
*Salmonella enteriditis*
*Campylobacter jejuni*
*Candida albicans*
Bacteria and fungi (specific screening in biocontrol):
*Erwinia amylovora*
*Pseudomonas syringae* pv. actinidiae
*Xanthomonas arboricola* pv. *pruni*
*Xanthomonas campestris*
*Alternaria solani*
*Botritis cinerea*
*Fusarium solani*
*Rizoctonia solani*
*Monilia laxa*
*Septoria tritici*

Two controls were prepared for the tests: a positive control of activity through use of Miconazole (against fungi) and Ceftriaxone (against bacteria).

All the tests have been carried out in triplicate, giving very similar inhibition results.

Results are given in the following tables. In parenthesis, the concentration (g/l) of copper relative to the corresponding copper-lignin derivative. For copper sulphate pentahydrate (copper) and copper hydroxide (copper 2) the MIC refer to the concentration of copper (g/l):

| Organic-inorganic hybrid material | E. coli | S. enteridis | P. aeruginosa MIC (g/l) | S. aureus | C. jejuni | C. albicans |
|---|---|---|---|---|---|---|
| HMW | 16 | 32 | 16 | 4 | 16 | 32 |
| HMW-Cu 2 | 8 (0.20) | 16 (0.42) | 16 (0.42) | 4 (0.10) | 16 (0.42) | 8 (0.20) |
| HMW-Cu 6 | 4 (0.22) | 8 (0.45) | 16 (0.90) | 2 (0.11) | 8 (0.45) | 2 (0.11) |
| HMW-Cu 10 | 2 (0.20) | 4 (0.40) | 4 (0.40) | 1 (0.10) | 4 (0.40) | 2 (0.20) |
| MMW | >32 | 32 | 32 | 16 | >32 | >32 |
| MMW-Cu 2 | 8 (0.18) | 32 (0.70) | >32 | 4 (0.09) | 16 (0.35) | 8 (0.18) |
| MMW-Cu 4 | 4 (0.16) | 16 (0.64) | 32 (1.2) | 4 (0.16) | 8 (0.32) | 8 (0.32) |
| MMW-Cu 9 | 4 (0.37) | 8 (0.74) | 16 (1.48) | 4 (0.37) | 8 (0.74) | 4 (0.37) |
| Copper | 0.32 | 0.65 | 1.30 | 0.32 | <0.16 | 1.30 |

| Organic-inorganic hybrid materials | E. amylovora | P. syringae | X. campestris | X. arboricola MIC (g/l) | R. solani | M. laxa | A. solani | F. solani | B. cinerea | S. tritici |
|---|---|---|---|---|---|---|---|---|---|---|
| HMW | 16 | 32 | 4 | 16 | >32 | 32 | >32 | >32 | >32 | 32 |
| HMW-Cu 2 | 8 (0.21) | 16 (0.42) | 4 (0.10) | 4 (0.10) | 8 (0.21) | 16 (0.42) | 32 (0.83) | 16 (0.42) | 32 (0.83) | 16 (0.42) |
| HMW-Cu 6 | 8 (0.45) | 8 (0.45) | 2 (0.11) | 2 (0.11) | 4 (0.22) | 8 (0.45) | 16 (0.90) | 16 (0.90) | 16 (0.90) | 16 (0.90) |
| HMW-Cu 10 | 4 (0.40) | 4 (0.40) | 2 (0.20) | 2 (0.20) | 4 (0.40) | 8 (0.80) | 8 (0.80) | 8 (0.80) | 8 (0.80) | 8 (0.80) |
| MMW | 32 | 16 | 32 | 8 | >32 | 16 | >32 | >32 | >32 | 32 |
| MMW-Cu 2 | 32 (0.7) | 32 (0.70) | 2 (0.04) | 8 (0.18) | 16 (0.35) | 16 (0.35) | >32 | 32 (0.7) | 8 (0.18) | 32 (0.7) |
| MMW-Cu 4 | 8 (0.32) | 16 (0.64) | 2 (0.08) | 4 (0.16) | 16 (0.64) | 8 (0.32) | >32 | 16 (0.64) | 8 (0.32) | 16 (0.64) |
| MMW-Cu 9 | 4 (0.37) | 8 (0.74) | 2 (0.18) | 4 (0.37) | 8 (0.74) | 8 (0.74) | 8 (0.74) | 8 (0.74) | 8 (0.74) | 8 (0.74) |
| Copper | 0.65 | 0.32 | 0.32 | <0.16 | 0.32 | 0.65 | 5.2 | 10.4 | 5.2 | 0.65 |

Example 12

Field Evaluation of Efficacy and Selectivity of the Organic-Inorganic Hybrid Material of Example HMW-Cu 10 Against *Botrytis Cinerea* on Strawberries in Greenhouse Condition Experimental Conditions:

| Crop: | *Fragaria* sp./Strawberry | Target disease: | *Botrytis cinerea* |
|---|---|---|---|
| Variety: | Four Season | Replicates: | 6 |
| Plot length/width: | 1.5 × 1.0 mt | Plot size: | 1.5 m² |
| Plots: | 54 | Plants/plot: | 10 |
| Trial design: | randomised complete block | | |

Crop INFORMATION:

| Crop/variety: | Strawberry/Four Season | Date of planting: | 10 Jan. 2018 |
|---|---|---|---|
| Plants/ha: | About 66667 | Distance in/between | 0.3 mt/0.5 mt |
| Growing system: | Pots | Soil type: | Clay/Loam |
| Date of harvest: | Beginning of May | Previous crop: | Ornamentals |
| Crop conditions: | The plants were in good vegetative conditions and were maintained in good conditions during trial period. | | |

Application Schedule and Product Description:

| Treat. | Product | active ingredient | g/l of Cu | Dosage rate/ha p.f. | g/ha of Cu |
|---|---|---|---|---|---|
| 1 | | untreated | | | |
| 2 | HMW | Lignin - High molecular weight | 100 g/l | 10 l | // |
| 3 | HMW | Lignin - High molecular weight | 100 g/l | 50 l | // |
| 4 | HMW-Cu 10 | Lignin HMW and copper 10% (Brochantite) | 80 g/l + 10 g/l | 10 l | 100 g/ha |
| 5 | ROVRAL WG | Iprodione | 75 g/100 g | 1 kg | // |
| 6 | Amylo-X | *Bacillus amyloliquefaciens* | 50 g/kg | 2.5 kg | // |

Results

Summary n.1—Percentage of attached fruits and efficacy of treatments against *Botrytis cinerea*

| Pest Scientific Name | *Botrytis* sp. | *Botrytis* sp. |
|---|---|---|
| Crop Scientific Name | *Fragaria* sp. | *Fragaria* sp. |
| Crop Variety | Four season | Four season |
| Description | % attacked fruits | % attacked fruits |
| Part Assessed | FRUIT P | FRUIT P |
| Assessment Date | 11 May 2018 | 24 May 2018 |
| Assessment Type | PESINC | PESINC |
| Assessment Unit | % | % |
| Sample Size, Unit | 1 PLOT | 1 PLOT |
| Crop Stage Majority | 81 | 89 |
| Pest Stage Majority | SPORUL | SPORUL |
| Trt-Eval Interval | 7 DA-A | 6 DA-C |
| ARM Action Codes | D05 APC | D05 APC |

| Treatment No. | Name | Rate Rate Unit | 1 | 2 |
|---|---|---|---|---|
| 1 | Untreated | | 9.34 (0%) | 16.67 (0%) |
| 2 | HMW | 10 l/ha | 2.78 (70%) | 9.19 (45%) |
| 3 | HMW | 50 l/ha | 1.19 (87%) | 5.68 (66%) |
| 4 | HMW-Cu 10 | 10 l/ha | 1.85 (80%) | 6.09 (63%) |
| 5 | ROVRAL WG | 1.0 kg/ha | 1.85 (80%) | 4.86 (71%) |
| 6 | Amylo-X | 2.5 kg/ha | 9.39 (0%) | 12.50 (25%) |

Summary n. 2—Weight of attached and healthy fruits and Percentage attached fruits of treatments against *Botrytis cinerea* on 28 May 2018

| | Treatment | Weight Attached Fruits (g) | Weight Healthy Fruits (g) | % Attached Fruits |
|---|---|---|---|---|
| 1 | Untreated | 14.17 | 29.17 | 30.00 |
| 2 | HMW - 10 l/ha | 8.83 | 30.67 | 16.11 |
| 3 | HMW - 50 l/ha | 4.33 | 32.50 | 14.17 |
| 4 | HMW-Cu 10 - 10 l/ha | 6.50 | 41.83 | 11.67 |
| 5 | ROVRAL WG - 1 kg/ha | 1.50 | 31.33 | 4.17 |
| 6 | Amylo-X WG - 2.5 kg/ha | 11.33 | 39.33 | 20.00 |

The results above reported show that the organic-inorganic hybrid material of the invention is surprisingly able to effectively act against *Botrytis cinerea*, at the same time significantly reducing the overall amount of Cu, i.e. a heavy metal, to be used.

Example 13

Field Evaluation of Efficacy and Selectivity of the Organic-Inorganic Hybrid Material of Example HMW-Cu$_{10}$ Against Various Bacteria and Diseases on Tomato in Greenhouse Experimental Conditions:

| Crop | *Solanum lycopersicum*./Tomato | Target disease | *Rhizoctonia* sp. |
|---|---|---|---|
| Variety: | Cuore del Ponente | Replicates: | 3 |
| Plot length/width | 1.5 mt × 1.5 mt | Plot size: | 2.25 m² |
| Plots: | 21 | Plants/plot: | 10 |
| Trial design | randomised complete block | | |

Crop Information:

| Crop/variety: | Tomato/Cuore del Ponente | Date of planting: | 13 Mar. 2018 |
|---|---|---|---|
| Plants/ha: | About 222223 | Distance in/between | 0.15 mt/0.3 mt |
| Growing | Pots | Soil type: | Clay/Loam |

-continued

| | |
|---|---|
| Date of harvest | Beginning of May Previous crop: Ornamentals |
| Crop conditions | The plants were in good vegetative conditions and were maintained in good conditions during trial period. |

Application Schedule and Product Description:

| Treat. | Product/Form. | active ingredient | g/l of Cu | Dosage rate/ha p.f. | g/ha of Cu |
|---|---|---|---|---|---|
| 1 | | UNTREATED | | | |
| 2 | HMW-Cu 10 | Lignin HMW e Cu 10% (Brochantite) | 3 g/l | 3 l | 30 g/ha |
| 3 | HMW-Cu 10 | Lignin HMW e Cu 10% (Brochantite) | 10 g/l | 10 l | 100 g/ha |
| 4 | Amylo-X | *Bacillus amyloliquefaciens* | | 2.5 l | // |
| 5 | Coprantol Hi Bio 2.0 WDG | Copper Hydroxide | 200 g/l | 3.0 l | 600 g/ha |

Results

| | | | | | |
|---|---|---|---|---|---|
| Pest Scientific Name | *Rhizoctonia s.* | *Rhizoctonia s.* | *Rhizoctonia s.* | *Rhizoctonia s.* | *Rhizoctonia s.* |
| Crop Scientific Name | *Solanum lyc.* | *Solanum lyc.* | *Solanum lyc.* | *Solanum lyc.* | *Solanum lyc.* |
| Crop Variety | Cuore del Ponente | Cuore del Ponente | Cuore del Ponente | Cuore del Ponente | Cuore del Ponente |
| Description | No attacked plant | No attacked plant | No attacked plant | No attacked plant | No attacked plant |
| Part Assessed | PLANT P | PLANT P | PLANT P | PLANT P | PLANT P |
| Assessment Date | 23 Mar. 2018 | 30 Mar. 2018 | 06 Apr. 2018 | 13 Apr. 2018 | 20 Apr. 2018 |
| Assessment Type | PESINC | PESINC | PESINC | PESINC | PESINC |
| Assessment Unit | NUMBER | NUMBER | NUMBER | NUMBER | NUMBER |
| Collection Basis, Unit | 10 PLANT | 10 PLANT | 10 PLANT | 10 PLANT | 10 PLANT |
| Crop Stage Majority | 13 | 15 | 19 | 29 | 51 |
| Trt-Eval Interval | 7 DA-A | 14 DA-A | 7 DA-B | 7 DA-C | 14 DA-C |
| ARM Action Codes | APC D05 | APC D05 | APC D05 | APC D05 | APC D05 |
| Untreated | 1.33 (0%) | 3.33 (0%) | 5.00 (0%) | 6.33 (0%) | 8.33 (0%) |
| HMW-Cu 10 | 0.00 (100%) | 0.00 (100%) | 0.00 (100%) | 0.00 (100%) | 0.00 (100%) |
| HMW-Cu 10 | 0.67 (50%) | 0.67 (80%) | 0.67 (87%) | 0.67 (89%) | 1.00 (88%) |
| Amylo-X | 0.67 (50%) | 1.33 (60%) | 2.33 (53%) | 3.00 (53%) | 3.67 (56%) |
| Coprantol Hi Bio 2.0 | 0.33 (75%) | 0.67 (80%) | 1.00 (80%) | 1.33 (79%) | 1.33 (84%) |

The sample HMW-Cu 10 has been tested and compared with a commercial Cu-based product, i.e. Coprantol, in order to assess the efficacy in controlling a bacterial infection caused by *Rizoctonia solani* on a greenhouse cultivation of tomato.

The tested amounts of Cu were respectively:
600 g/ha for Coprantol
100 g/ha for HMW-Cu 10
30 g/ha for HMW-Cu 10

Figure 21:
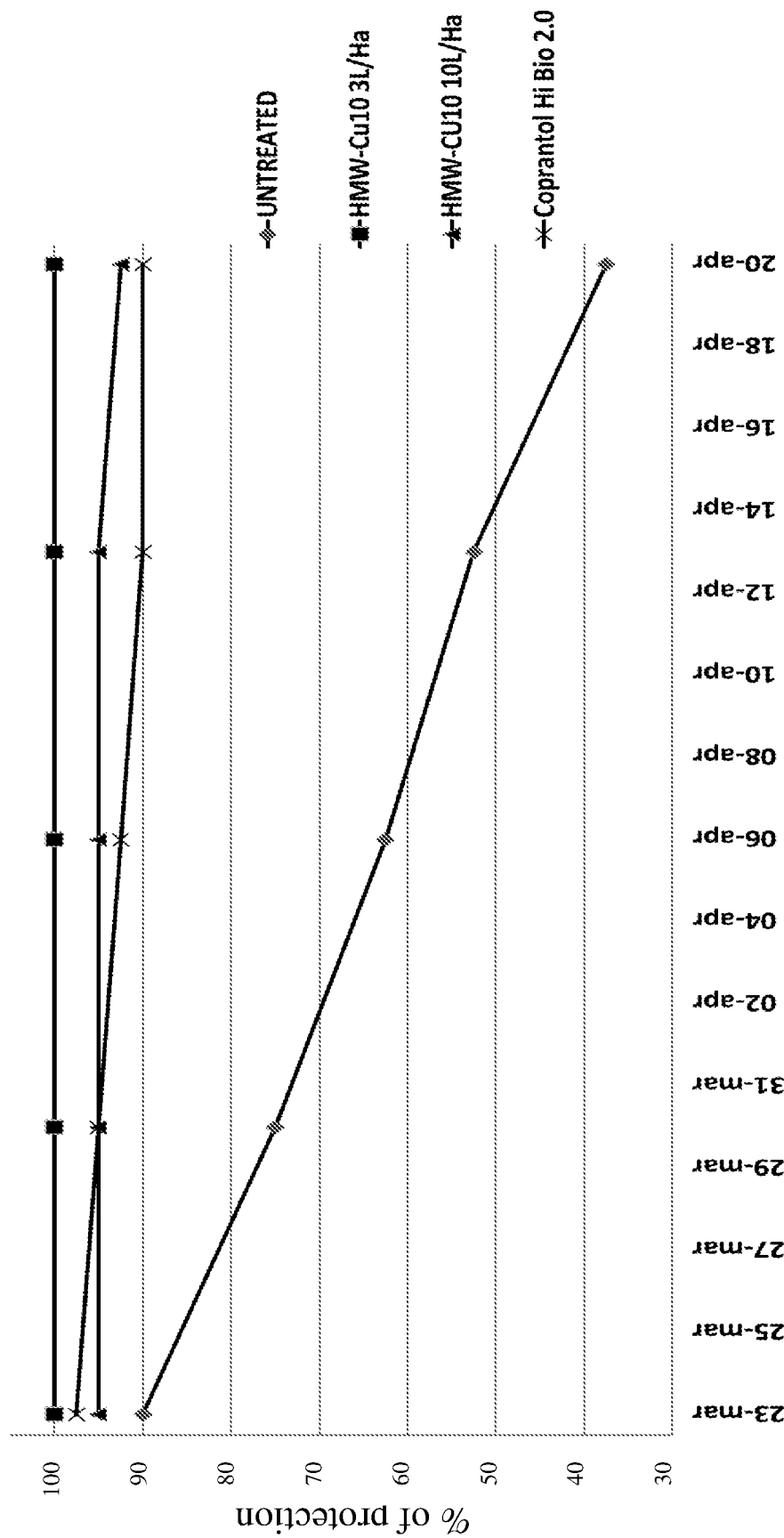
FIG. 21 shows the efficacy in controlling a bacterial infection caused by *Rizoctonia solani* on a greenhouse cultivation of tomato of two samples HMW-Cu 10 in comparison with a commercial Cu-based product, i.e. Coprantol®, as per Example 11.

As clearly shown in FIG. 21, both the tests with HMW-Cu 10 unexpectedly and surprisingly show an efficacy higher than Coprantol, although the very low amounts used, i.e. lower than 6 and 20 times the Coprantol amount.

The invention claimed is:

1. An organic-inorganic hybrid material consisting essentially of a metal compound and a lignin fraction, wherein:
the metal compound is selected from metal hydroxide, metal oxide, metal halide, metal sulphate, metal nitrate, metal gluconate, metal acetate, metal carbonate, metal oxychloride, and combinations thereof, and the metal is selected from Mg, Ca, Ti, Fe, Mn, Co, Ni, Cu, Zn, Ag, Al, and mixtures thereof,
the lignin fraction comprises fragments having a weight average molecular weight of 4,400 Daltons to 6,000 Daltons and 24-33 phenylpropane units on weight average, a number average molecular weight of 1,200 to 1,300 Daltons and 6-7 phenylpropane units on number average, and wherein the metal compound is embedded in the lignin fraction in an amount up to 50 wt %, based on the weight of the organic-inorganic hybrid material, or
wherein:
the metal compound is selected from metal hydroxide, metal oxide, metal halide, metal sulphate, metal nitrate, metal gluconate, metal acetate, metal carbonate, metal oxychloride, and combinations thereof, and the metal is selected from Mg, Ca, Ti, Fe, Mn, Co, Ni, Cu, Zn, Ag, Al, and mixtures thereof,
the lignin fraction comprises fragments having a weight average molecular weight of 800 Daltons to 1,500 Daltons and 4-8 phenylpropane units on weight average, a number average molecular weight of 300 to 700 Daltons and 2-4 phenylpropane units on number average,
and wherein the metal is embedded in the lignin fraction in an amount up to 50 wt %, based on the weight of the organic-inorganic hybrid material.

2. The hybrid material of claim 1, wherein said metal is selected from Mg, Ca, Ti, Fe, Mn, Co, Ni, Cu, Zn, Ag, Al, and mixtures thereof.

3. The hybrid material of claim 1, wherein the metal compound comprises brochantite, gerhardtite, goethite, lepidocrocite, or a mixture thereof.

4. The hybrid material of claim 1, wherein said lignin fraction comprises fragments having a weight average molecular weight of 150 Daltons to 6,000 Daltons, as measured by Size-Exclusion Chromatography.

5. The hybrid material of claim 1, wherein:
the metal compound is selected from brochantite, gerhardtite, goethite, lepidocrocite, or a mixture thereof,
the lignin fraction comprises fragments having a weight average molecular weight of 150 Daltons to 5,500

Daltons, said fragments comprising up to 30 phenylpropane units on weight average, and comprises fragments having a number average molecular weight up to 2,000 Daltons, said fragments comprising up to 11 phenylpropane units on number average,
and wherein the metal is embedded in the lignin fraction in an amount up to 40 wt %, based on the weight of the organic-inorganic hybrid material.

6. A process for preparing the organic-inorganic hybrid material of claim 1, said process comprising the steps of:
   i) providing a water solution of the metal compound,
   ii) adding the lignin fraction and mixing for at least 1 hour,
   iii) adjusting the pH to 7-8, by adding a base, and
   iv) recovering and drying the resulting organic-inorganic hybrid material,
or
   a) providing the metal compound and the lignin fraction in a powdered and dry form,
   b) adding a base, thus obtaining a solid mixture,
   c) grinding the solid mixture in a planetary ball mill,
   d) collecting the resulting organic-inorganic hybrid material.

7. A food product or food supplement comprising the organic-inorganic hybrid material of claim 1, and suitable food ingredients or food carriers.

8. The food product or food supplement of claim 7, wherein the organic-inorganic hybrid material acts as an antimicrobial agent in human and animal feed.

9. The food product or food supplement of claim 7, further comprising at least one resin acid.

10. The food product or food supplement of claim 9, comprising up to 10 wt % of said at least one resin acid, on the weight of the food product or the food supplement.

11. The food product or food supplement of claim 7, further comprising at least one alkali or alkaline-earth salt of fatty acid C12-C24, at least one fatty oil, or a mixture thereof.

12. The food product or food supplement of claim 11, comprising said at least one alkali or alkaline-earth salt of fatty acid C12-C24, at least one fatty oil, or a mixture thereof, in a concentration of 1-100 kg per ton of food product or food supplement.

13. The food product or food supplement of claim 7, to be added as an antimicrobial agent in livestock feeding or pet food.

14. The hybrid material of claim 1, wherein said metal is Cu, Fe or a mixture thereof.

15. The hybrid material of claim 1, wherein said lignin fraction is not chemically modified.

16. An agro-chemical product comprising: agro-chemical additives, and an organic-inorganic hybrid material consisting essentially of a metal compound and a lignin fraction, wherein:
the metal compound is selected from metal hydroxide, metal oxide, metal halide, metal sulphate, metal nitrate, metal gluconate, metal oxychloride, metal acetate, metal carbonate, metal silicate, metal aluminosilicate, and combinations thereof, and the metal is selected from Li, Na, K, Be, Mg, Ca, Sr, Ba, Ti, Cr, Mn, Fe, Co, Ni, Cu, Zn, Ag, Au, Al, Bi, As, and mixtures thereof,
the lignin fraction comprises fragments having a weight average molecular weight up to 10,000 Daltons, as measured by Size-Exclusion Chromatography, said fragments comprising up to 55 phenylpropane units on weight average, and said lignin fraction comprises fragments having a number average molecular weight up to 2,000 Daltons, as measured by Size-Exclusion Chromatography, wherein the metal compound is embedded in the lignin fraction in an amount up to 50 wt %, based on the weight of the organic-inorganic hybrid material.

17. An agro-chemical product comprising:
agro-chemical additives, and
an organic-inorganic hybrid material consisting essentially of a metal compound and a lignin fraction, wherein:
the metal compound is selected from metal hydroxide, metal oxide, metal halide, metal sulphate, metal nitrate, metal gluconate, metal oxychloride, metal acetate, metal carbonate, metal silicate, metal aluminosilicate, and combinations thereof, and the metal is selected from Li, Na, K, Be, Mg, Ca, Sr, Ba, Ti, Cr, Mn, Fe, Co, Ni, Cu, Zn, Ag, Au, Al, Bi, As, and mixtures thereof,
the lignin fraction comprises fragments having a weight average molecular weight up to 10,000 Daltons, as measured by Size-Exclusion Chromatography, said fragments comprising up to 55 phenylpropane units on weight average, and said lignin fraction comprises fragments having a number average molecular weight up to 2,000 Daltons, as measured by Size-Exclusion Chromatography, wherein the metal compound is embedded in the lignin fraction in an amount up to 50 wt %, based on the weight of the organic-inorganic hybrid material, and
wherein the organic-inorganic hybrid material is in an amount so as to have a metal concentration of 5-200 grams per liter of the agro-chemical product.

* * * * *